(12) United States Patent
Ouderkirk et al.

(10) Patent No.: US 11,635,622 B1
(45) Date of Patent: Apr. 25, 2023

(54) NANOVIDED SPACER MATERIALS AND CORRESPONDING SYSTEMS AND METHODS

(71) Applicant: META PLATFORMS TECHNOLOGIES, LLC, Menlo Park, CA (US)

(72) Inventors: Andrew John Ouderkirk, Redmond, WA (US); Katherine Marie Smyth, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 45 days.

(21) Appl. No.: 16/213,912

(22) Filed: Dec. 7, 2018

(51) Int. Cl.
*B32B 3/30* (2006.01)
*G02B 27/01* (2006.01)
(Continued)

(52) U.S. Cl.
CPC ............ *G02B 27/0172* (2013.01); *B32B 3/30* (2013.01); *B32B 5/145* (2013.01); *B32B 17/06* (2013.01);
(Continued)

(58) Field of Classification Search
CPC .. B32B 3/26; B32B 3/263; B32B 3/30; Y10T 428/24479; Y10T 428/24521–24537; Y10T 428/2457; Y10T 428/24587; Y10T 428/24612; G02B 5/00–32; G02B 3/00–08; G02B 5/0247; G02B 2207/107; G02F 1/133504; G02F 1/133507; H01L 51/5268
See application file for complete search history.

(56) References Cited

U.S. PATENT DOCUMENTS 9,400,343 B1 * 7/2016 Pethuraja ................ G02B 1/111
2005/0276071 A1 * 12/2005 Sasagawa ............. G02B 30/27
362/607
(Continued)

FOREIGN PATENT DOCUMENTS

KR 20180023717 A * 3/2018
WO WO-2017157807 A2 * 9/2017 ............... G02C 7/02

OTHER PUBLICATIONS

Machine translation of KR 2018/0023717 A.*
(Continued)

*Primary Examiner* — Z. Jim Yang
(74) *Attorney, Agent, or Firm* — Greenberg Traurig, LLP

(57) ABSTRACT

A nanovoided spacer material that is used as a mechanical buffer between at least two optical components. The optical components may include gratings (e.g., Bragg gratings, moth-eye surfaces, etc.) having sensitive and fragile surfaces (e.g., patterned surfaces). The nanovoided spacers may have a predetermined thickness and concentration of nanovoids to provide a given optical property (e.g., a reflection coefficient at an interface between two optical elements). The nanovoided spacer may include a multilayer structure (e.g., two or more layers) of varying refractive index (e.g., to reduce reflections between surfaces of the optical elements). The nanovoided spacer may include from about 10% to 90% nanovoids by volume and may have an average index of refraction of about 1.15. Various other methods, systems, apparatuses, and materials are also disclosed.

19 Claims, 10 Drawing Sheets

(51) Int. Cl.
  *B32B 17/06* (2006.01)
  *B32B 5/14* (2006.01)
  *G02B 5/02* (2006.01)
(52) U.S. Cl.
  CPC .... *G02B 5/0247* (2013.01); *G02B 2027/0178* (2013.01); *Y10T 428/24521* (2015.01); *Y10T 428/24529* (2015.01); *Y10T 428/24537* (2015.01)

(56) References Cited

U.S. PATENT DOCUMENTS

| | | | | |
|---|---|---|---|---|
| 2008/0176041 A1* | 7/2008 | Sato | ................ | H01L 51/5275 428/161 |
| 2009/0073564 A1* | 3/2009 | Lin | ................ | G02B 5/0278 359/599 |
| 2011/0051250 A1* | 3/2011 | Fujita | ................ | B23K 26/355 359/601 |
| 2011/0170184 A1* | 7/2011 | Wolk | ................ | G02B 6/0065 359/625 |
| 2011/0286222 A1* | 11/2011 | Coleman | ................ | G02B 6/0065 156/219 |
| 2012/0038990 A1* | 2/2012 | Hao | ................ | G02B 5/0268 428/221 |
| 2012/0098421 A1* | 4/2012 | Thompson | ................ | H01L 51/5262 428/315.9 |
| 2012/0200931 A1* | 8/2012 | Haag | ................ | G02B 5/0242 359/599 |
| 2012/0206923 A1* | 8/2012 | Tanaka | ................ | G02B 5/0231 264/2.7 |
| 2013/0004728 A1* | 1/2013 | Boyd | ................ | F21V 11/00 359/485.01 |
| 2013/0011608 A1* | 1/2013 | Wolk | ................ | B29D 11/00865 977/932 |
| 2013/0039094 A1* | 2/2013 | Kolb | ................ | G02B 5/0263 521/149 |
| 2013/0222911 A1* | 8/2013 | Coggio | ................ | G02B 5/0242 359/493.01 |
| 2013/0235614 A1* | 9/2013 | Wolk | ................ | G02B 6/0066 362/606 |
| 2014/0021492 A1* | 1/2014 | Wolk | ................ | H01L 51/5275 257/88 |
| 2014/0169036 A1* | 6/2014 | Lee | ................ | G02B 1/10 29/428 |
| 2014/0375928 A1* | 12/2014 | Zhuang | ................ | G02B 5/045 359/625 |
| 2015/0219974 A1* | 8/2015 | Trajkovska-Broach | ................ | G02F 1/1525 359/275 |
| 2016/0016338 A1* | 1/2016 | Radcliffe | ................ | C09J 7/00 428/203 |
| 2016/0131819 A1* | 5/2016 | Musashi | ................ | G02B 1/045 428/317.9 |
| 2016/0193808 A1* | 7/2016 | Nishimura | ................ | B32B 3/30 428/41.5 |
| 2016/0333634 A1* | 11/2016 | Free | ................ | F21S 11/007 |
| 2016/0334562 A1* | 11/2016 | Richards | ................ | G02B 6/0035 |
| 2017/0075146 A1* | 3/2017 | Nishimura | ................ | G02C 9/04 |
| 2017/0075207 A1* | 3/2017 | Tao | ................ | G02B 5/0242 |
| 2017/0235203 A1* | 8/2017 | Yamamoto | ................ | C07C 219/32 359/268 |
| 2017/0261656 A1* | 9/2017 | Kim | ................ | G02B 5/205 |
| 2017/0307790 A1* | 10/2017 | Bellman | ................ | C03C 17/22 |
| 2017/0357100 A1* | 12/2017 | Ouderkirk | ................ | G02B 27/281 |
| 2018/0004013 A1* | 1/2018 | Vasiliev | ................ | G02B 27/0172 |
| 2018/0149796 A1* | 5/2018 | Xu | ................ | G02B 6/0065 |
| 2018/0224672 A1* | 8/2018 | Wu | ................ | G02B 7/02 |
| 2018/0252941 A1* | 9/2018 | Dobschal | ................ | G02C 7/02 |
| 2018/0329207 A1* | 11/2018 | Sitter | ................ | G02B 5/0215 |
| 2019/0023947 A1* | 1/2019 | Sitter | ................ | G02B 5/1847 |
| 2019/0056591 A1* | 2/2019 | Tervo | ................ | G02B 6/0016 |
| 2019/0094420 A1* | 3/2019 | Choi | ................ | H05K 5/03 |
| 2019/0187342 A1* | 6/2019 | Hatakeyama | ................ | G02B 1/118 |
| 2019/0339432 A1* | 11/2019 | Du | ................ | G02B 6/0025 |
| 2019/0369294 A1* | 12/2019 | Chang | ................ | G02B 1/118 |
| 2020/0089000 A1* | 3/2020 | Hayashi | ................ | G09G 3/3406 |
| 2020/0192095 A1* | 6/2020 | Puetz | ................ | G02C 7/02 |
| 2021/0026143 A1* | 1/2021 | Sitter | ................ | G02B 27/0103 |
| 2021/0094220 A1* | 4/2021 | Tazawa | ................ | G02B 27/0101 |

OTHER PUBLICATIONS

3M Company, "3M Brightness Enhancement Film", 3M Display Materials and Systems Division, Application Guidelines, Effective: Jan. 10, 2018, 4 pages.

* cited by examiner

NANOVIDED SPACER MATERIALS AND CORRESPONDING SYSTEMS AND METHODS

BACKGROUND

Augmented reality (AR) and virtual reality (VR) eyewear devices or headsets may enable users to experience events, such as interacting with people in a computer-generated simulation of a three-dimensional world or viewing data superimposed on a real-world view. AR/VR eyewear devices and headsets may also be used for purposes other than recreation. For example, governments may use such devices for military training simulations, doctors may use such devices to practice surgery, and engineers may use such devices them as visualization aids.

AR/VR eyewear devices and headsets typically include some form of optical system or device, such as an optical lens assembly configured to focus or direct light from the device's display and/or the real world to the user's eyes. Thus, there is a need for improving such optical systems.

SUMMARY

As will be described in greater detail below, the instant disclosure describes spacer materials having nanovoids, and associated systems and methods. In various embodiments, an optical system is described. The optical system may include a first optical component, a second optical component spaced from the first optical component, and a material defining a plurality of nanovoids. In another embodiment, the material may be coupled to the first optical component and may be coupled to the second optical component to serve as a buffer between the first optical component and the second optical component.

In one embodiment, at least one of the first optical component or the second optical component may include a patterned surface. In another embodiment, at least one of the first optical component or the second optical component may include at least one of a refractive element, a polarizing element, or a reflective element. In one embodiment, a thickness of the material and a concentration of the nanovoids per unit volume in the material may be configured to adjust an optical property associated with the optical system, the optical property including at least one of a reflectance, an absorption, or a transmittance of light incident on the optical system.

In another embodiment, the material further may include a first region having a first refractive index corresponding to a first concentration of nanovoids per unit volume, and a second region having a second refractive index corresponding to a second concentration of nanovoids per unit volume, the first region and the second region being overlapped in a thickness direction of the material. In one embodiment, the material may include a concentration of the nanovoids per unit volume that is approximately 10% to approximately 90%. In another embodiment, the material may include an average refractive index of about 1.05 to about 1.3. In one embodiment, the adhesive material may include an index of refraction that is greater than approximately 1.05.

In one embodiment, the material may be fabricated using at least one of a chemical vapor deposition process, a thermal evaporation process, or a spin-coating process. In another embodiment, the material may be laminated to a surface of the first optical component or a surface of the second optical component. In one embodiment, a surface of the first optical component or a surface of the second optical component may be convex, concave, flat, or irregular. In another embodiment, the material may be coupled to at least one of a surface of the first optical component or a surface of the second optical component by an adhesive material.

In various embodiments, a head-mounted display is described. The head-mounted display may include a display, a first optical component, a second optical component spaced from the first optical component, and a material defining a plurality of nanovoids. In another embodiment, the material may be coupled to the first optical component and may be coupled to the second optical component to serve as a buffer between the first optical component and the second optical component. In another embodiment, the head-mounted display may include an augmented reality device, a virtual reality device, or a mixed reality device.

In one embodiment, the first optical component or the second optical component may include at least one of a refractive element, a polarizing element, or a reflective element. In another embodiment, a thickness of the material and a concentration of the nanovoids per unit volume in the material may be configured to adjust an optical property associated with the head-mounted display, the optical property including at least one of a reflectance, an absorption, or a transmittance of light in the head-mounted display. In one embodiment, the material may include a concentration of the nanovoids per unit volume that is approximately 10% to approximately 90%.

In various aspects, a method may include positioning a first optical component, positioning a second optical component spaced from the first optical component, and positioning a material defining a plurality of nanovoids. In another embodiment, the material may be configured to couple to the first optical component and couple to the second optical component to serve as a buffer between the first optical component and the second optical component. In one embodiment, the material may include a concentration of the nanovoids per unit volume that is approximately 10% to approximately 90%. In another embodiment, the material may include an average refractive index of about 1.05 to about 1.3.

While the exemplary embodiments described herein are susceptible to various modifications and alternative forms, specific embodiments will be described in detail herein. However, the exemplary embodiments described herein are not intended to be limited to the particular forms disclosed. Rather, the instant disclosure covers all modifications, equivalents, and alternatives falling within this disclosure.

Features from any of the embodiments of the present disclosure may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
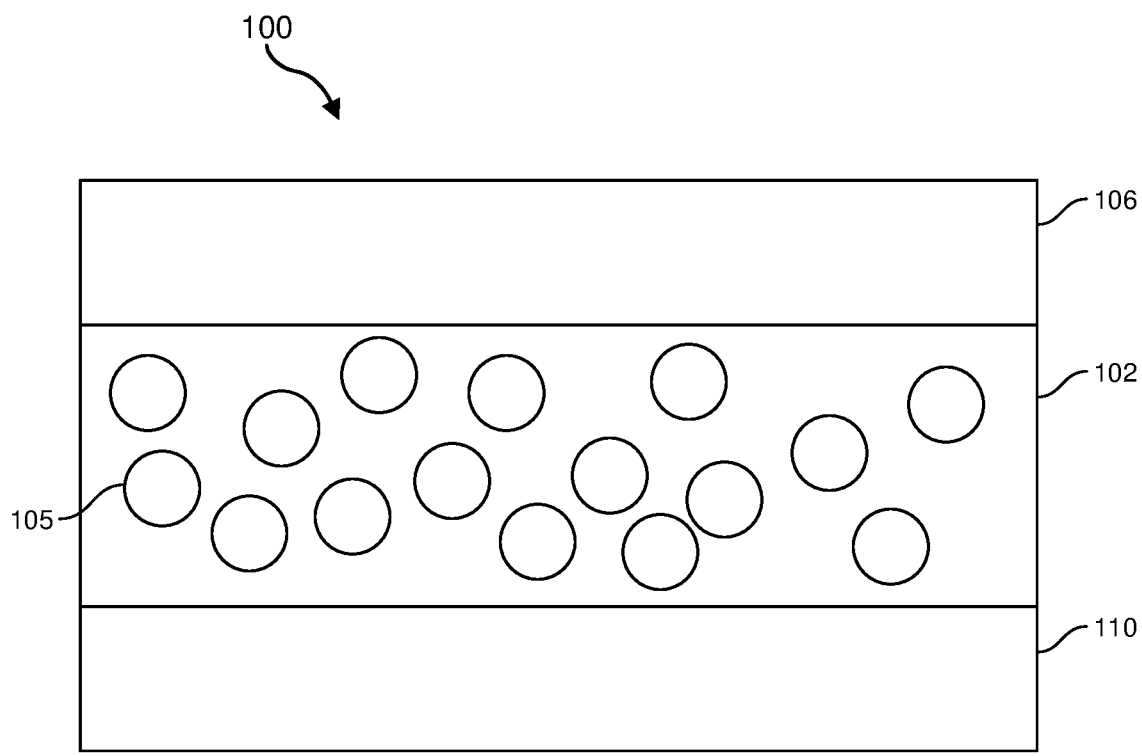
FIG. 1A shows a diagram of a nanovoided spacer material, in accordance with example embodiments of the disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be explained in greater detail below, embodiments of the instant disclosure are generally directed to nanovoided spacer materials, and methods and systems for manufacturing or forming such nanovoided spacer materials.

In various embodiments, a nanovoided spacer material is described. The nanovoided spacer material may include a layer of material that may be used as a mechanical buffer between at least two optical components. The optical components may include a wide variety of optical elements such as lenses, mirrors, windows, diffusers, filters, polarizers, prisms, beamsplitters, and/or gratings, and the like. In another embodiment, such gratings (e.g., Bragg gratings, moth-eye surfaces, and the like) may have sensitive and fragile surfaces (e.g., patterned surfaces). In one embodiment, the nanovoided spacers may have a predetermined thickness and concentration of nanovoids, for example, to provide a given optical property (e.g., a reflection coefficient at an interface between two optical elements). In another embodiment, the nanovoided spacer may include a multilayer structure (e.g., two or more layers) of varying refractive index (e.g., to reduce reflections between surfaces of the optical elements). The nanovoided spacer may include anywhere from about 10% to 90% nanovoids by volume and may have an average index of refraction of between about 1.1 and about 1.2, for example, about 1.15. In various aspects, the nanovoided spacer can be fabricated using a variety of methods including chemical vapor deposition (CVD), physical vapor deposition (PVD), atomic layer deposition (ALD), and thermal evaporation. Further, the nanovoided spacer may be coupled to an optical element by any suitable means. For example, the nanovoided spacer may be laminated to a surface of the first or second optical material or may be formed directly on the surfaces of the optical materials.

The following will provide, with reference to FIGS. 1-10, detailed descriptions of systems, methods, and apparatuses for optical systems implementing nanovoided spacers. The discussion associated with FIGS. 1A and 1B includes a description of a nanovoided spacers that may be used with various embodiments. The discussion associated with FIG. 2 includes a description of a multilayer nanovoided spacer that may be used with optical elements. The discussion associated with FIG. 3 includes a description of an electroactive device that may be used with various embodiments. The discussions associated with FIGS. 4-5 include descriptions of the formation of the nanovoids in the nanovoided spacer material. The discussion associated with FIGS. 6-7 include descriptions of fabrication systems and methods that may be used to make the nanovoided spacer materials in accordance with various embodiments. The discussion associated with FIG. 8 includes an attachment means for coupling the nanovoided spacer material to an optical element. The discussion associated with FIG. 9 includes a description of an example flow for the fabrication of a nanovoided spacer material, in accordance with various embodiments. The discussion relating to FIG. 10 includes an example head-worn near-eye-display having lenses that may be used in conjunction with the nanovoided spacer materials. While many of the examples discussed herein may be directed to head-worn display systems, embodiments of the instant disclosure may be implemented in a variety of different types of devices and systems.

FIG. 1A shows a diagram 100 of a nanovoided spacer material, in accordance with example embodiments of the disclosure. In some embodiments, the nanovoided spacer material may be referred to herein as an optically transparent material 102, which may include electroactive polymers and/or elastomer materials containing a plurality of nanovoids 105. As used herein, "electroactive polymers" may refer to polymers that exhibit a change in size or shape when stimulated by an electric field. In some examples, an "electroactive polymer" may refer to a deformable polymer that may be symmetric with regard to electrical charge (e.g., polydimethylsiloxane (PDMS) acrylates, and the like) or asymmetric (e.g., poled polyvinylidene fluoride (PVDF) or its copolymers such as poly[(vinylidenefluoride-co-trifluoroethylene] (PVDF:TrFE)).

Some electroactive polymers may find limited applications due to a low breakdown voltage of the polymers with respect to the operating voltage used by electroactive devices (e.g., reflectors) that use the polymers. Accordingly, electroactive devices with reduced operating voltages and higher energy densities may be useful for many applications. Additional examples of polymer materials forming electroactive polymer materials may include, without limitation, styrenes, polyesters, polycarbonates, epoxies, halogenated polymers, such as PVDF, copolymers of PVDF, such as PVDF-TrFE, silicone polymers, and/or any other suitable polymer materials. Such materials may have any suitable dielectric constant or relative permittivity, for example, a dielectric constant ranging from approximately 2 to approximately 30.

In some embodiments, an "elastomer material" may refer to a polymer with viscoelasticity (i.e., both viscosity and elasticity) and relatively weak intermolecular forces, and generally low elastic modulus (a measure of the stiffness of a solid material) and high failure strain compared with other materials. In some embodiments, the optically transparent material 102 may include an elastomer material that has an effective Poisson ratio of less than a predetermined value (e.g., less than approximately 0.35, less than approximately 0.3, less than approximately 0.2, or less than approximately 0.1). In at least one example, the elastomer material may have an effective density that is less than a predetermined value (e.g., less than approximately 90%, less than approximately 80%, less than approximately 60%, or less than approximately 40%) of the elastomer when densified (e.g., when the elastomer is compressed, for example, by electrodes (to be discussed further below) to make the elastomer denser). As noted, in some examples, the optically transparent material 102 may be nanovoided (e.g., having a plurality of nano-sized voids in the material). In some embodiments, the nanovoids may be at least approximately 10% (alternatively, at least approximately 30%, at least approximately 50%, or at least approximately 70%) of the volume of the optically transparent material 102.

In some examples, the term "effective density" may refer to a parameter that may be obtained using a test method where a uniformly thick layer of an optically transparent material (e.g., elastomer) may be placed between two flat and rigid circular plates. In some embodiments, the diameter of the optically transparent material being compressed may be at least 100 times the thickness the optically transparent material. The diameter of the optically transparent material may be measured, then the plates may be pressed together to exert a pressure of at least approximately $1\times10^6$ Pa on the optically transparent material, and the diameter of the optically transparent material may be remeasured. The effective density may be determined from the following expression: D_ratio=D_uncompressed/D_compressed, where D_ratio may represent the effective density ratio, D_uncompressed may represent the density of the uncompressed optically transparent material, and D_compressed may represent the density of the uncompressed optically transparent material.

In some embodiments, some of the optically transparent material 102 may include nanovoided polymer materials that may include thermoplastic polymers. Suitable polymers may include, but are not limited to, polyolefins, for example, polyethylene homopolymers and copolymers, polypropylene, polypropylene homopolymers and copolymers, functionalized polyolefins, polyesters, poly(ester-ether), polyamides, including nylons, poly(ether-amide), polyether sulfones, fluoropolymers, polyurethanes, and mixtures thereof. Polyethylene homopolymers include those of low, medium or high density and/or those formed by high-pressure or low-pressure polymerization. Polyethylene and polypropylene copolymers include, but are not limited to, copolymers with C4-C8 alpha-olefin monomers, including 1-octene, 1-butene, 1-hexene and 4-methyl pentene.

Other non-limiting examples of suitable olefinic polymeric compositions for use as the nanovoided polymer materials include olefinic block copolymers, olefinic random copolymers, polyurethanes, rubbers, vinyl arylenes and conjugated diener, polyesters, polyamides, polyethers, polyisoprenes, polyneoprenes, copolymers of any of the above, and mixtures thereof.

Examples of suitable copolymers for use as the nanovoided polymer materials include, but are not limited to, copolymers such as poly(ethylene-butene), poly(ethylene-hexene), poly(ethylene-octene), and poly(ethylene-propylene), poly(ethylene-vinylacetate), poly(ethylene-methylacrylate), poly(ethylene-acrylic acid), poly(ethylene-butylacrylate), poly(ethylene-propylenediene), poly(methyl methacrylate) and/or polyolefin terpolymers thereof.

In some embodiments, the nanovoided polymer materials may include elastomeric polymers, including styrenic block copolymers, elastomeric olefinic block copolymers and combinations thereof. Non-limiting examples of suitable styrenic block copolymers (SBC's) include styrene-butadiene-styrene (SBS), styrene-isoprene-styrene (SIS), styrene-ethylene-butylene-styrene (SEBS), styrene-ethylene-propylene (SEP), styrene-ethylene-propylene-styrene (SEPS), or styrene-ethylene-ethylene-propylene-styrene (SEEPS) block copolymer elastomers, polystyrene, and mixtures thereof. In one embodiment, the film may include styrene-butadiene-styrene, polystyrene, and/or mixtures thereof.

The nanovoided polymer materials may further include optional components, such as fillers, plasticizers, compatibilizers, draw down polymers, processing aids, anti-blocking agents, viscosity-reducing polymers, and the like. Other additives may include pigments, dyes, antioxidants, antistatic agents, slip agents, foaming agents, heat or light stabilizers, UV stabilizers, and the like.

In some embodiments, the optically transparent material 102 may have a thickness of approximately 10 nm to approximately 10 μm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 μm, approximately 2 μm, approximately 3 μm, approximately 4 μm, approximately 5 μm, approximately 6 μm, approximately 7 μm, approximately 8 μm, approximately 9 μm, approximately 10 μm), with an example thickness of approximately 200 nm to approximately 500 nm.

As noted, in some embodiments, the optically transparent material 102 may include particles of a material having a high dielectric constant, the particles having an average diameter between approximately 10 nm and approximately 1000 nm. In some embodiments, the material having the high dielectric constant may include barium titanate, $BaTiO_3$, which is a member of the perovskite family and which may also include other titanates. Additionally or alternatively, any other suitable component may be added to the electroactive polymer material. $BaTiO_3$ is a ferroelectric material with a relatively high dielectric constant (e.g., a value of between approximately 500 and approximately 7000) and polarization and may be used in various electroactive devices described herein. Besides large polarizability and permittivity, large strains may also be achievable with $BaTiO_3$. Pure $BaTiO_3$ may be an insulator whereas upon doping it may transform into a semiconductor in conjunction with the polymer material. In some embodiments, the particles of the materials having high dielectric constant may be included in the polymer to modify a mechanical (e.g., a Poisson's ratio) or electrical property (resistance, capacitance, etc.) of the nanovoided materials.

In various embodiments, the optical components 106 and/or 110 may include, but not be limited to, lenses, mirrors, windows, diffusers, filters, polarizers, prisms, beamsplitters, and/or diffraction gratings, and the like. Optical components 106 and/or 110 may be used to alter the state of light through a variety of means including focusing, filtering, reflecting, and/or polarizing, and the like. Optical components 106 and/or 110 may be integrated into a variety of applications, such as microscopy, imaging, or interferometry, for industries ranging from the life sciences to testing and measurement. In another embodiment, optical components 106 and/or 110 may be designed using specific substrates or anti-reflection coatings to optimize performance in designated ultraviolet, visible, or infrared wavelengths or wavelength ranges. In one embodiment, optical lenses may be designed for focusing or diverging lighting. Optical filters may be used to selectively pass or block a specific wavelength or wavelength range. In another embodiment, optical mirrors, prisms, or beamsplitters may split or alter the path of light through an optical system. In one embodiment, windows may be used to protect sensitive components such as electronic detectors or sensors from outside environments.

In some examples, the optical components 106 and/or 110 may include any suitable materials, such as glass and/or plastic. The optical components 106 and/or 110 may include, for example, a lens that may include a crown glass material, such as a borosilicate crown glass material. In another embodiment, the crown glass may include additives such as zinc oxide, phosphorus pentoxide, barium oxide, and/or fluorite and lanthanum oxide, which may alter the optical or mechanical properties of the lenses. In another example, the lens may include a plastic material. For example, the lens may include a CR-39 lens material, due to its low specific gravity and low dispersion. In another example, the lens may include a polymer, such as a urethane-based polymer. In one embodiment, the lens may include a UV-blocking material, such as polycarbonate. Furthermore, the lens may include a high-refractive-index plastic, such as thiourethanes, in which sulfur content in the polymer may tune the index-of-refraction of the plastic.

In one embodiment, the optical components 106 and/or 110 may include a substrate. The substrate may include transparent materials such as sapphire or glass. In one embodiment, the substrate may include silicon, silicon oxide, silicon dioxide, aluminum oxide, an alloy of silicon and germanium, and/or indium phosphide (InP), and the like. In some embodiments, the substrate may include a semiconductor material (e.g., monocrystalline silicon, germanium, silicon germanium, SiGe, and/or a III-V based material (e.g., gallium arsenide), or any combination thereof. In various embodiments, the substrate may include a polymer-based substrate, glass, or any other bendable substrate including two-dimensional materials (e.g., graphene and molybdenum disulfide), organic materials (e.g., pentacene), transparent oxides (e.g., indium gallium zinc oxide, IGZO), polycrystalline III-V materials, polycrystalline germanium, polycrystalline silicon, amorphous III-V materials, amorphous germanium, amorphous silicon, or any combination thereof.

In another embodiment, the optical components 106 and/or 110 may be coupled to the optically transparent material 102 having nanovoids using an adhesive layer (not shown). In one embodiment, the adhesive layer may be made of any suitable material, having any suitable predetermined refractive index to minimize reflections at boundaries between the optical components 106 and/or 110 and the optically transparent material 102. For example, the adhesive may be a self-assembled monolayer, a pressure sensitive adhesive, a standard reactive adhesive, or the like. Self-assembled monolayer adhesives may use a silane coupling agent including an alkoxysilane and a reactive functional group. The silane coupling unit may covalently react with a glass substrate and the reactive functional group may react with the optically transparent material 102. Examples of silane coupling agents may include, for example, 3-glycidoxypropyltrimethoxysilane, (2-aminoethyl)aminopropyltriethoxysilane, aminopropyltrimethoxysilane, aminopropyltriethoxysilane, (2-aminoethyl)aminopropylmethyldimethoxysilane, methacyryloxypropylmethyltrimethoxysilane, ethacyryloxypropyltrimethoxysilane, glycidoxypropyltrimethoxysilane, mercaptopropyl trimethoxysilane, vinyltriacetoxysilane, chloropropyltrimethoxysilane, vinyltrimethoxysilane, octadecyldimethyl-[3-(trimethoxysilyl)-propyl]ammonium chloride, mercaptopropyl-methyl-dimethoxysilane, isocyanatopropyltriethoxysilane, (3-acryloxypropyl)trimethoxy-silane, and the like.

Pressure sensitive adhesives (PSA) may usually be polymeric materials applied between two layers for forming a bond with the desired cohesive strength upon application of pressure. A primary mode of bonding for a pressure sensitive adhesive may not be chemical or mechanical, but rather may be a polar attraction of an adhesive to a given material. Pressure sensitive adhesives may be designed with a balance between flow and resistance to flow. The bond may form because the adhesive may be soft enough to flow or wet the substrate. The bond may have strength because the adhesive may be hard enough to resist flow when stress is applied to the bond. Once the adhesive and the substrate are in proximity of each other, additional molecular interactions occur, such as, for example, Van der Waals' forces, capillary forces and the like, or combinations thereof, which may provide a significant contribution to the strength of the bond.

Figure 1B:
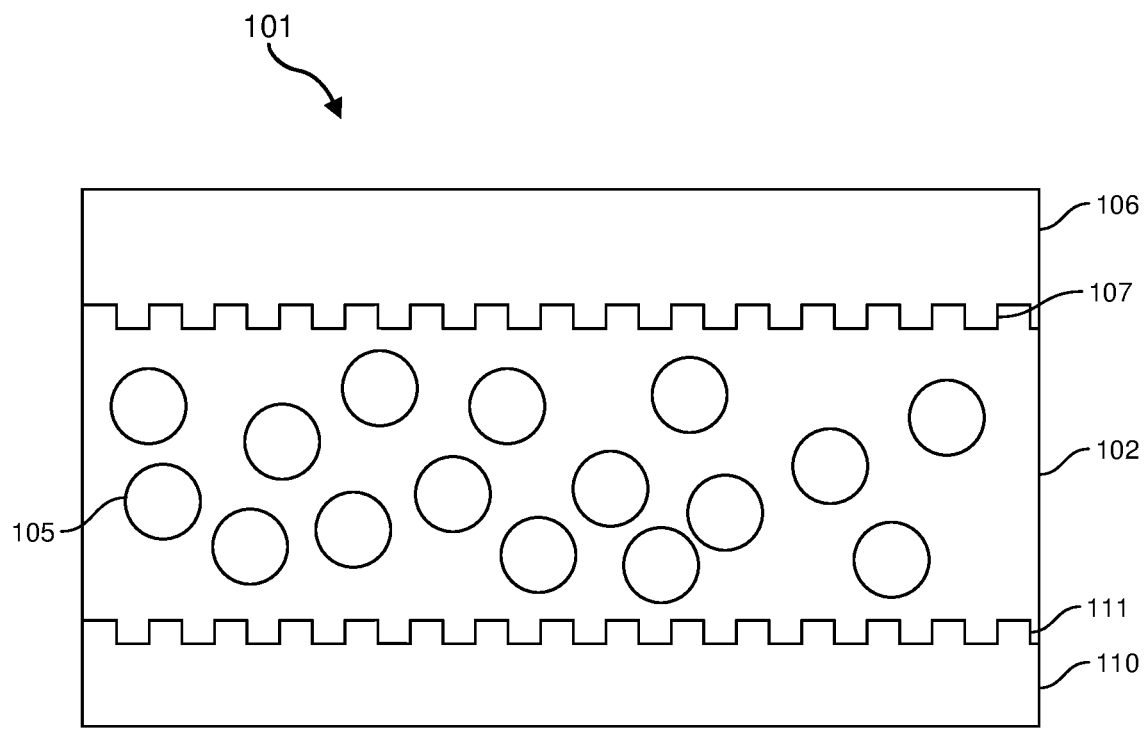
FIG. 1B shows another diagram of a nanovoided spacer material, in accordance with example embodiments of the disclosure.

FIG. 1B shows another diagram of a nanovoided spacer material, in accordance with example embodiments of the disclosure. In particular, diagram 101 also shows the nanovoided spacer material referred to here also as an optically transparent material 102 in addition to the optical components 106 and/or 110. In additional embodiments, the optical components 106 and/or 110 may include surfaces that may be rough, such as surface 107 corresponding to optical component 106 and surface 111 corresponding to optical component 110. This may be, for example, due to the fact that the optical components 106 and/or 110 may include components that have patterned surfaces (e.g., protrusions and recess patterns) formed on at least a portion of the surface of the optical components 106 and/or 110. In one embodiment, these patterns may include protrusions arranged at intervals equal to or smaller than the wavelength of incident radiation (e.g., visible light). In some embodiments, if the optical components 106 and/or 110 include a moth-eye surface, the protrusions may include conical shaped nanostructures, frustoconical shaped nanostructures, pyramid-shaped nanostructures, trapezoidal shaped nanostructures, and/or truncated pyramid shaped nanostructures, where each nanostructure individually has a height of about 10 nm to about 1000 nm.

In some embodiments, the surface 107 corresponding to optical component 106 and/or surface 111 corresponding to optical component 110 may include individual nanostructures having a height of about 10 nm to about 1000 nm, about 15 nm to about 750 nm, about 20 nm to about 500 nm, about 30 nm to about 300 nm, and/or any individual height or range encompassed by these example ranges. In some embodiments, the nanostructures may be conically and/or frustoconically shaped, and a circumferential base may have a radius of from about 10 nm to about 500 nm, about 25 nm to about 400 nm, about 50 nm to about 300 nm, or any individual radius or range encompassed by these example ranges. In other embodiments the nanostructures may be pyramidally shaped and/or trapezoidal shaped (e.g., having one or more trapezoidal shaped surfaces and/or a trapezoidal shaped cross-sectional profile) having a square or a triangular base; further, the sides of the square or triangular base may be from about 10 nm to about 1000 nm, about 25 nm to about 750 nm, about 50 nm to about 500 nm, about 75 nm to about 400 nm, or any individual length or range encompassed by these example ranges.

In some embodiments, the surface 107 corresponding to optical component 106 and/or surface 111 corresponding to optical component 110 may include randomly arranged nanostructures. Alternatively, the surface 107 corresponding to optical component 106 and/or surface 111 corresponding to optical component 110 may include nanostructures that are arranged in a repeating pattern, for example, parallel rows, alternating rows, concentric squares, circular patterns, swirl patterns, and/or concentric circles. In some embodiments, an integer number (e.g., two or more, three or more, etc.) of such patterns may be included in separate portions of the index gradient structures, and in other embodiments, such patterns may be applied on top of one another. In still other embodiments, portions of the surface 107 and/or surface 111 may be patterned in one design, and other portions of the surface 107 and/or surface 111 may be patterned in another design. Whether the nanostructures are randomly arranged, patterned, or combinations thereof, the nanostructures may be spaced from one another by a predetermined distance (e.g., a distance of about 10 nm to about 800 nm) as measured from the geometric center of an individual nanostructure to the geometric center of a neighboring nanostructure. As such, the surface 107 and/or surface 111 of various embodiments may have a nanostructure pitch or lateral periodicity of about 1 nanostructure every 10 nm to about 500 nm, about 1 nanostructure every 100 nm to about 400 nm, about 1 nanostructure every 150 nm to about 300 nm, or any individual periodicity or range encompassed by these example ranges.

In another embodiment, a composite layered structure may be used to form a microelectromechanical structure (MEMS), where the structure has a first structural layer, a second structural layer, and a nanovoided material between the first and the second layer. As an example, the structure may be made of an inorganic material, including silicon, II-VI materials, metals such as aluminum, carbon, including amorphous carbon, graphite, graphene, diamond like or diamond, or ceramics such as silicon carbide, silicon nitride, silicon oxide, aluminum oxide, aluminum nitride, or other ceramic materials. This composite may be used for making strong, stiff, and lightweight structures.

Moreover, it is to be understood that such surface 107 and/or surface 111 may have any suitable form factor. For example, the form factor for the optical components 106 and/or 110 may be any form such flat, convex, concave, and/or irregular (e.g., as formed by a melt-molded product, an injection-molded product, a press-molded product, and/or the like).

Figure 1C:
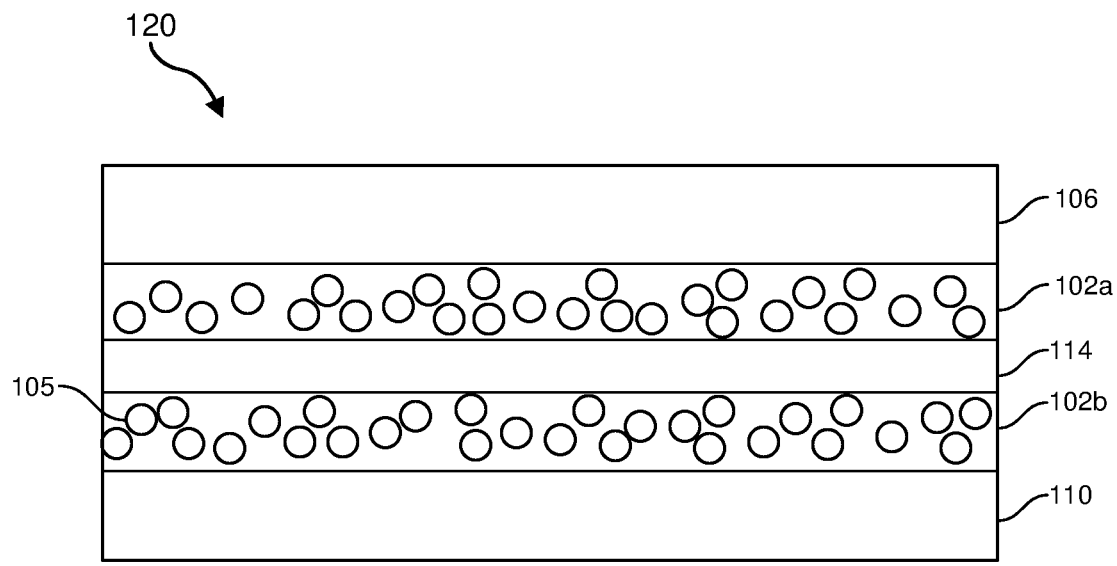
FIG. 1C shows a diagram of optical components coupled to an optical structure, in accordance with example embodiments of the disclosure.

FIG. 1C shows a diagram of optical components coupled to an optical structure, in accordance with example embodiments of the disclosure. In particular, FIG. 1C shows a diagram 120 including an optical component 106 coupled (e.g., bonded) to a first optically transparent material 102a. Further, diagram 120 shows an optical component 110 coupled (e.g., bonded) to a second optically transparent material 102b. Moreover, an intermediary layer, such as a bonding layer 114, may serve to couple the optically transparent material 102a and second optically transparent material 102b. In an embodiment, the first optically transparent material 102a and/or the second optically transparent material 102b may include nanovoids 105. The bonding layer 114 may include any suitable material, such as an optical adhesive material, discussed further below. In one embodiment, the bonding layer 114 may have any suitable thickness and any suitable index of refraction, as discussed further below.

In various embodiments, the structure shown in diagram 120 can be assembled by forming at least one layer of first optically transparent material 102a on optical component 106 and at least one layer of second optically transparent material 102b on optical component 110, then bonding the first optically transparent material 102a and the second optically transparent material 102b to each other using a bonding layer 114. In one embodiment, the bonding layer 114 may include a pressure sensitive adhesive or a curable layer (e.g., a radiation or thermally cured material). Suitable curable materials may include free-radically cured monomers where the free radicals are produced through an initiator that forms free radicals (e.g., using visible or UV light), or directly (e.g., using an electron beam). In another embodiment, the bonding layer 114 may include a condensation cured system (e.g., an epoxy or a polyurethane) or a hydrosilation cured polymer (e.g., polydimethylsiloxane, PDMS). In one embodiment, the bonding layer 114 may not penetrate into the first and/or second optically transparent materials 102a and/or 102b (collectively referred to herein as optically transparent material 102) past a certain threshold amount or percentage. In another embodiment, the bonding layer 114 may partially penetrate into the optically transparent material 102 (e.g., within a threshold amount or percentage). In various embodiments, a portion of the optically transparent material 102 that is not penetrated by the bonding layer 114 may be at least about 0.5 micron thick. In another embodiment, the bonding layer 114 may be about 5 microns thick. In one embodiment, the optically transparent material 102 may be between 0.5 microns and about 100 microns thick. Additional layers may be added between the optically transparent material 102 and the bonding layer 114 to, for example, reduce optical reflectivity, or penetration of the materials that form the bonding layer 114, or a combination thereof.

Figure 1D:
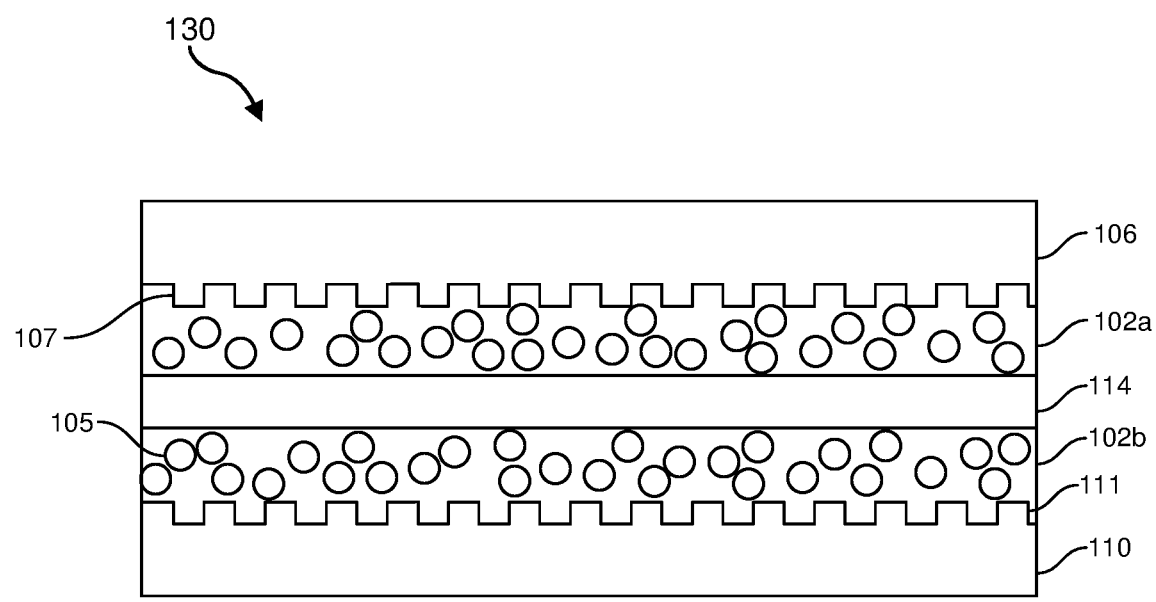
FIG. 1D shows another diagram of optical components coupled to an optical structure, in accordance with example embodiments of the disclosure.

FIG. 1D shows another diagram of optical components coupled to an optical structure, in accordance with example embodiments of the disclosure. In particular, FIG. 1D shows a diagram 130 including an optical component 106 that may be coupled (e.g., bonded) to a first optically transparent material 102a. Moreover, diagram 130 includes an optical component 110 that may be coupled (e.g., bonded) to a second optically transparent material 102b. In one embodiment, the optical component 106 may include a surface 107 having an uneven surface, such as, for example, a rough and/or patterned surface. Additionally or alternatively, optical component 110 may include a surface 111 having an uneven surface, such as, for example, a rough and/or patterned surface. In other respects, the elements of diagram 130 may be similar, but not necessarily identical to, similarly numbered elements as shown and described in connection with FIG. 1C, above.

Figure 2:
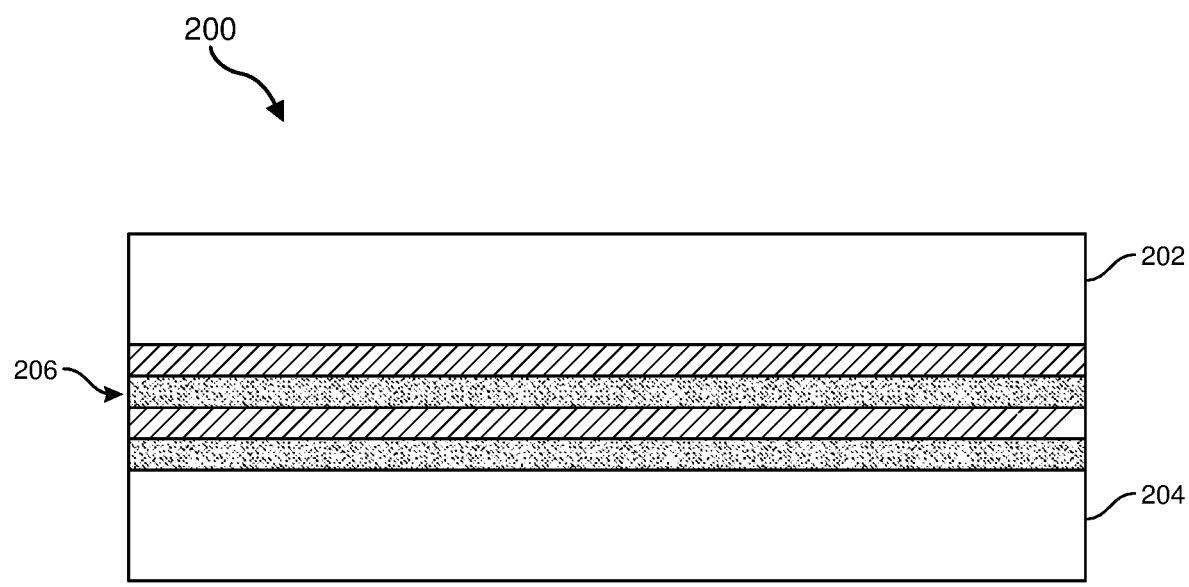
FIG. 2 shows a diagram of a nanovoided spacer multilayer material, in accordance with example embodiments of the disclosure.

FIG. 2 shows a diagram of a nanovoided spacer multilayer material, in accordance with example embodiments of the disclosure. In various embodiments, diagram 200 includes a multilayer nanovoided spacer, which may be referred to herein as an optically transparent material 206. In at least one embodiment, the optically transparent material 206 may include an antireflective structure or Bragg reflector that may include multiple layers having nanovoids and may be positioned between optical components 202 and 204, to, for example, reduce the reflections between components and to provide a mechanical buffer between the optical components 202 and 204. Further the multilayer optically transparent material 206 can be optimized for layer count, thicknesses, and/or refractive indices to provide a reflectance below a given threshold for incident light of a predetermined angular range (e.g., normal incidence to a pre-determined off-normal angle). The multilayer optically transparent material 206 may have additional layers to provide for broadband spectral reflectivity. In one embodiment, one or more of the nanovoided materials may be composed of a polymer. Suitable polymers include, but are not be limited to, silicone, including those based on polydimethyl siloxanes, acrylates, including polymethyl methacrylate, ethyl acrylate, butyl acrylate, di-, tri-, and polyfunctional acrylates for crosslinkers, styrenes, urethanes, imides, olefins, homopolymer, copolymers, block copolymers and combinations thereof. In an aspect, the nanovoided material can be fabricated using a variety of methods including chemical vapor deposition, spin coating, and thermal evaporation.

In various embodiments, the optical components 202 and/or 204 may include, but not be limited to, lenses, mirrors, windows, diffusers, filters, polarizers, prisms, beamsplitters, and/or diffraction gratings, and the like. As noted, optical components may be used to alter the state of light through a variety of means including focusing, filtering, reflecting, and/or polarizing, and the like. In some examples, the optical components 202 and/or 204 may include any suitable materials, such as glass and/or plastic, as described above. In one embodiment, the optical components 202 and/or 204 may include a substrate, as described above.

In another embodiment, the optical components 202 and/or 204 may be coupled to the multilayer optically transparent material 206 having nanovoids using an adhesive layer (not shown). In one embodiment, the adhesive layer may be made of any suitable material, having a predetermined refractive index to minimize reflections at boundaries between the optical components 202 and/or 204 and the optically transparent material 206. In additional the optical components 202 and/or 204 may include surfaces that may be rough. This may be, for example, due to the fact that the optical components 202 and/or 204 may include components that have patterned surfaces (e.g., protrusions and recess patterns) continuously formed on at least a portion of the surface of the optical components 202 and/or 204.

Figure 3:
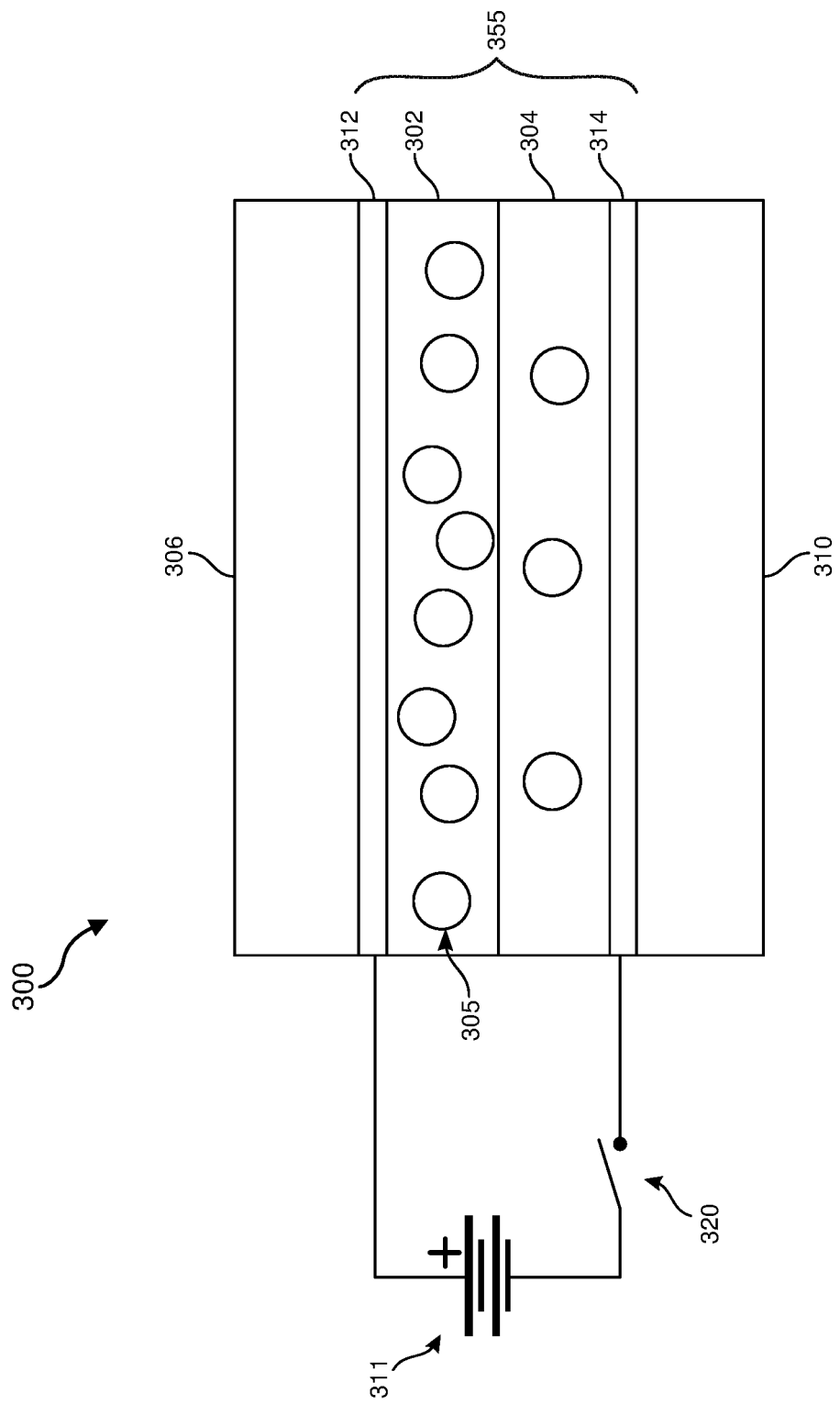
FIG. 3 shows a diagram of an electroactive device including a nanovoided spacer material, in accordance with example embodiments of the disclosure.

FIG. 3 shows a diagram of an electroactive device including a nanovoided spacer material, in accordance with example embodiments of the disclosure. In particular, diagram 300 includes nanovoided spacer materials such as first optically transparent material 302 and second optically transparent material 304 that may include electroactive polymers and/or elastomer materials having nanovoids 305, as variously described above. Further, in various embodiments, diagram 300 includes optical components 306 and/or 310 that may include, but not be limited to, lenses, mirrors, windows, diffusers, filters, polarizers, prisms, beamsplitters, and/or diffraction gratings, and the like, as described above.

In another embodiment, diagram 300 represents an electroactive device including, in addition to the first optically transparent material 302 having nanovoids 305 and the second optically transparent material 304, a voltage source 310, a switch 320, a first transparent conductor 312, and a second transparent conductor 314. In some embodiments, the voltage source 310 may refer to a two-terminal device which may maintain a fixed voltage in an electronic circuit. In some embodiments, the first transparent conductor 312 and the second transparent conductor 314 may sandwich layers of the optically transparent material 302 and may be adjacent to the optical elements 306 and 310. The operation of the electroactive device is further shown and described below.

As noted, the optically transparent material 302 may be a first optically transparent material having a nanovoided material (e.g., a polymer such as an elastomer having nanovoids 305), and there may be a second optically transparent material 304 that may include a material with a substantially lower concentration of nanovoids, as compared with first optically transparent material 302, or a material that is free or substantially free of nanovoids (e.g., a material including less 5% or less than 1% nanovoids by volume). A nanovoid stack 355 may include the first transparent conductor 312, the second transparent conductor 314, the first optically transparent material 302, and the second optically transparent material 304. In some embodiments, while two pairs of optically transparent materials (e.g., first optically transparent materials 302 and second optically transparent material 304) are described, there may be more optically transparent materials (e.g., third, fourth, fifth, etc. pairs of optically transparent materials, similar to that shown and described in connection with FIG. 2, above).

In various embodiments, the first transparent conductor 312 and/or the second transparent conductor 314 may be configured in any suitable manner. For example, in some embodiments, the first transparent conductor 312 and/or the second transparent conductor 314 may be formed from a thin film of electrically conductive and semi-transparent material, such as indium tin oxide (ITO). In some implementations, alternatives to ITO may be used, including transparent conductive oxides (TCOs), including wider-spectrum TCOs, conductive polymers, metal grids, carbon nanotubes (CNT), graphene, nanowire meshes, and thin-metal films. Additional TCOs may include doped binary compounds, such as aluminum-doped zinc-oxide (AZO) and indium-doped cadmium-oxide. Moreover, TCOs may include barium stannate and metal oxides, such as strontium vanadate and calcium vanadate. In some implementations, conductive polymers may be used. For example, a poly(3, 4-ethylenedioxythiophene) poly(styrene sulfonate) (PEDOT:PSS) layer may be used. In another example, a poly (4,4-dioctyl cyclopentadithiophene) material doped with iodine or 2,3-dichloro-5,6-dicyano-1,4-benzoquinone (DDQ) may be used. The example polymers and similar materials may be spin-coated in some example embodiments.

Further, the first transparent conductor 312 and/or the second transparent conductor 314 may include any suitable material such as electrically conductive materials suitable for use in thin-film electrodes, such as, for example, aluminum, silver, indium, gallium, zinc, carbon black, and/or any other suitable materials formed by vacuum deposition, spray, adhesion, and/or any other suitable technique. In some embodiments, the first transparent conductor 312 and/or the second transparent conductor 314 may be self-healing, such that damage from local shorting of a circuit may be isolated. Suitable self-healing electrodes may include thin films of metals, such as aluminum. In some configurations, it may be necessary for the first transparent conductor 312 and/or the second transparent conductor 314 to stretch elastically. In such embodiments, the first transparent conductor 230a and/or the second transparent conductor 230b may include TCOs, graphene, carbon nanotubes, and the like. In some embodiments, the first transparent conductor 312 and/or the second transparent conductor 314 may have a thickness of approximately 1 nm to approximately 500 nm, with an example thickness of approximately 10 nm to approximately 100 nm. In one embodiment, the first transparent conductor 312 and/or the second transparent conductor 314 may be designed to allow healing of electrical breakdown (e.g., the electric breakdown of the nanovoided materials such as the first optically transparent material 302 having nanovoids 305).

In some embodiments, the first transparent conductor 312 and/or the second transparent conductor 314 may be fabricated using any suitable process. For example, the first transparent conductor 312 and/or the second transparent conductor 314 may be fabricated using PVD, CVD, sputtering, spray-coating, spin-coating, ALD, and the like. In another embodiment, the first transparent conductor 312 and/or the second transparent conductor 314 may be manufactured using a thermal evaporator, a sputtering system, a spray coater, a spin-coater, an ALD unit, and the like.

As noted, in some embodiments, the optically transparent materials (e.g., the first optically transparent material 302 and second optically transparent material 304) may include electroactive polymers and/or elastomer materials. Some electroactive polymers may find limited applications due to a low breakdown voltage of the polymers with respect to the operating voltage used by electroactive devices (e.g., reflectors) that use the polymers. Accordingly, electroactive devices with reduced operating voltages and higher energy densities may be useful for many applications. Additional examples of polymer materials forming electroactive polymer materials may include, without limitation, styrenes, polyesters, polycarbonates, epoxies, halogenated polymers, such as PVDF, copolymers of PVDF, such as PVDF-TrFE, silicone polymers, and/or any other suitable polymer materials. Such materials may having any suitable dielectric constant or relative permittivity, for example, a dielectric constant ranging from approximately 2 to approximately 30.

In some embodiments, the voltage difference between the first transparent conductor 312 and the second transparent conductor 314 may cause the nanovoid stack 355 to mechanically compress in comparison to the nanovoid stack 355 having no applied voltage difference between the first transparent conductor 312 and the second transparent conductor 314, increasing the average refractive index of the nanovoided layer (e.g., the first optically transparent material 312) of the nanovoid stack 355. In particular, the compression of the nanovoid stack 355 may reduce the average refractive index difference between the compressed first optically transparent material 302 and the compressed second optically transparent material 304 as compared to the average refractive index difference between the first optically transparent material 302 and the second optically transparent material 304 prior to compression. In another embodiment, the reduced index difference between the compressed first optically transparent material 302 and the compressed second optically transparent material 304 may substantially affect a fraction of light (not shown) that is reflected by the nanovoid stack 355 between the optical components 306 and 310. In various examples, a greater portion of light may be transmitted through nanovoid stack 355 after compression.

As noted, when the nanovoids are compressed, the index difference between the nanovoided layers (e.g., the first optically transparent material 302) and the reduced-concentration nanovoided layers (e.g., the second optically transparent material 304) of the electroactive device may be reduced; however, the optical pathlength (e.g., the product of the geometric length of the path light follows through the layers of the nanovoid stack 355, and the index of refraction of the layers of the nanovoided stack 355 through which the light propagates) may not change substantially upon compression of the nanovoided stack 355, and accordingly, the peak reflection (e.g., the wavelength of maximal reflectivity) for the electroactive device may not change substantially either during the compression of the nanovoid stack 355. For example, if the electroactive device is compressed by a factor of two, the refractive index may approximately double while the thickness of the layers of the nanovoid stack 355 may be reduced by half. Accordingly, the optical path of the electroactive device may remain the same or substantially the same. In contrast, in an electroactive device without compressible nanovoids, if the index of refraction changes while the thickness of the layers remains approximately the same or is reduced by less than half, the optical pathlength may change and, accordingly, the peak wavelength of the electroactive device may shift.

In some embodiments, the application of a voltage to the electroactive nanovoid stack 355 may change the internal pressure of gases or liquids in the nanovoided regions of the compressed first optically transparent material 302, which may include electroactive polymers defining the compressed nanovoided regions. For example, gases or liquids may diffuse either into or out of the electroactive polymers during dimensional changes associated with its deformation. Such changes in the electroactive polymers may affect, for example, the hysteresis of an electroactive device incorporating the electroactive polymer during dimensional changes, and also may result in drift when the electroactive polymer's dimensions are rapidly changed. Accordingly, in an embodiment, the nanovoids may be filled with a gas to suppress electrical breakdown of the electroactive polymers (for example, during deformation). In another embodiment, the gas may include sulfur hexafluoride, fluorocarbon gases (e.g., 3M NOVEC 4710 insulating gas, available from 3M Company, Maplewood, Minn., USA), or any suitable gas.

In another embodiment, the electroactive device may have a sealing layer (not shown) applied to the edges of the electroactive device, or to one or more of the transparent conductors (e.g., first transparent conductor 312 or second transparent conductor 314) or a combination thereof. Suitable sealing layers may include thin film layers of an inorganic material, such as silica, applied with any suitable method, for example, ALD, PVD, CVD, or the like. Sealing of the edges of the device 300 may be done after the nanovoided materials are filled with gas. Suitable methods for filling the nanovoided materials may include removing the solvent, either under vacuum, within a supercritical fluid such as supercritical $CO_2$, or by aging the material in a desired gas, such as air, sulfur hexafluoride or fluorocarbons.

Vents may be incorporated into the thin film coatings during the deposition process, such as by adding a shadow mask, or vents may be added later by etching, decomposing, or ablating an array of holes, lines, or other shapes into the optical structure after or during deposition. The thin film layers may also be made from one or more dyads of a polymer layer and an inorganic layer. In an embodiment, the sealing layer may also include a barrier material such as polychlorotrifluoroethylene (PCTFE) or other polymer applied by solvent or with initiated-CVD. The thin film layers may also be made from one or more dyads of a polymer layer and an inorganic layer. In an embodiment, the sealing layer may also include a barrier material such as polychlorotrifluoroethylene (PCTFE) or other polymer applied by solvent or with initiated-CVD (iCVD).

Figure 4:
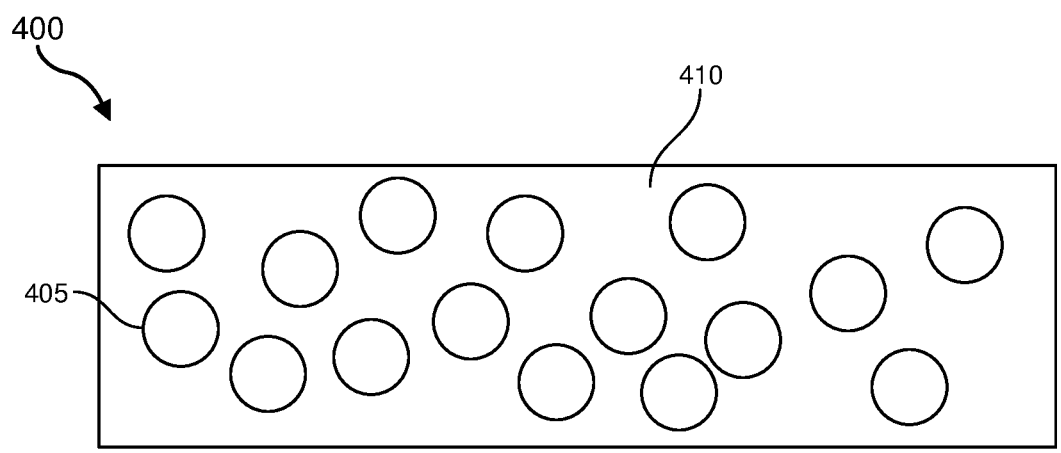
FIG. 4 shows a diagram illustrating aspects of the formation of nanovoids in a material (e.g., a polymer) such as a nanovoided spacer material, in accordance with example embodiments of the disclosure.

FIG. 4 shows aspects of the formation of nanovoids in a material (e.g., a polymer), in accordance with example embodiments of the disclosure. In particular, diagram 400 in FIG. 4 illustrates aspects of the formation of nanovoids in a material 410 (e.g., a polymer), which may serve as a nanovoided spacer material described above. In another embodiment, a material precursor such as a monomer may be deposited with a solvent, and the monomer and solvent may be cured leading to the separation of the solvent and the formation of the nanovoids 405 in the material 410.

In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the nanovoided material. The voids and/or nanovoids may be either closed- or open-celled, or a mixture thereof. If they are open-celled, the void size may be the minimum average diameter of the cell. In some embodiments, the nanovoided material may include a thermoset material and/or any other suitable material.

The voids and/or nanovoids may be any suitable size and, in some embodiments, the voids may approach the scale of the thickness of the nanovoided material. For example, the voids may be between approximately 10 nm to about equal to the thickness of the nanovoided material. In some embodiments, the voids may be between approximately 10 nm and approximately 1000 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

Figure 5:
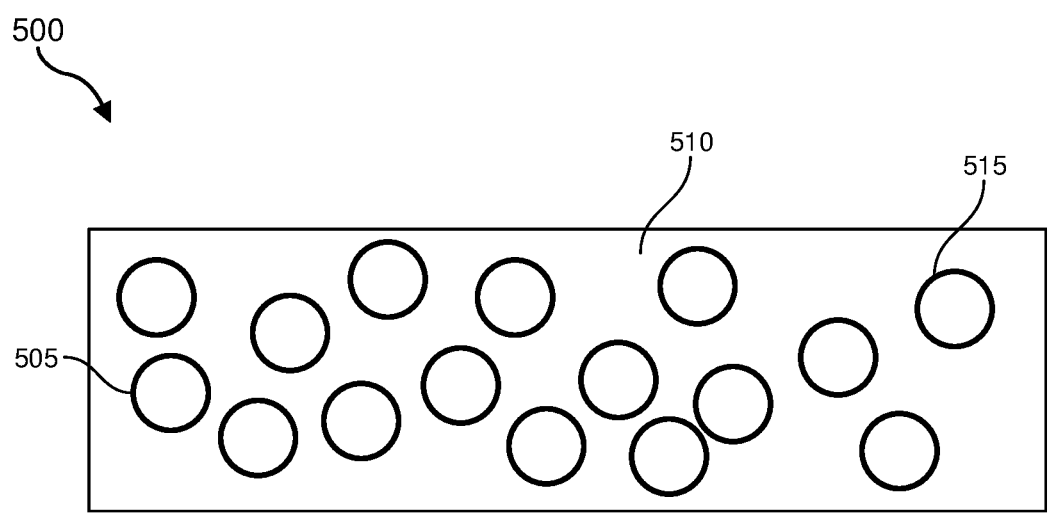
FIG. 5 shows a diagram illustrating aspects of the formation of a nanovoided spacer material using a B-stage polymer for the formation of nanovoids, where the nanovoids may be coated, in accordance with example embodiments of the disclosure.

FIG. 5 shows a diagram 500 illustrating aspects of a nanovoided material 510 formed using, for example, a B-stage polymer (also referred to as B-stage epoxy or partially cured epoxy and/or polymer) for the formation of nanovoids 505, where the nanovoids may be coated, as will be described. In particular, diagram 500 illustrates aspects of the formation of nanovoids in a material 510, which may serve as a nanovoided spacer material described above. To form the nanovoids 505 in the nanovoided material 510, two monomers may be mixed. Further, a first monomer may be cured by a first source of radiation (e.g., UV light), while another monomer may be cured by a second source of radiation (e.g., heat or x-rays). Further, when the first monomer is cured to form a polymer, the polymer may exclude the second monomer along with the solvent and thereby form nanovoids 505, which may include solvent and/or the second monomer internally.

As noted, two different sources of radiation may be used to generate the nanovoided material 510 for B-stage epoxies. In an example system, a first monomer may include a free-radical initiated monomer which may be activated (e.g., polymerized) by UV light, while a second monomer may include a different monomer type such as an epoxy, that is unaffected by the first type of radiation (e.g., UV light). Moreover, the second monomer may be cured by a second type of radiation, such as heat. Accordingly, when the first monomer, second monomer, and solvent are mixed, the first monomer and second monomer may both dissolve in the solvent. The mixture may then be irradiated with a first type of radiation (e.g., UV light) such that the first monomer begins to polymerize and form a first polymer. The solvent and the second monomer regions that surround the polymerizing first monomer may be excluded from polymerizing first monomer, leading to the formation of partially formed nanovoids. Further, excluded regions that include the solvent and second monomer may remain inside the partially formed nanovoids. When heat is further applied to the partially formed nanovoids, the solvent may start evaporating and the second monomer may coat the inside of the partially formed nanovoids, leading to the formation of the nanovoids 505 shown in FIG. 5. Accordingly, the nanovoids 505 may not move; rather the material (e.g., the second monomer and/or solvent) in the partially formed nanovoids may evaporate and the second monomer and/or the solvent may coat the interiors of the nanovoids 505. The second monomer (e.g., an epoxy) may then be polymerized to form polymer layers 515 that include a second polymer coating the interiors of the nanovoids 505 defined in the nanovoided material 510.

Moreover, because the different polymers (e.g., a first polymer and a second polymer) respectively formed from the first and second monomers may have different indices of diffraction and/or different mechanical properties, more sophisticated nanovoided materials may be formed using the B-stage epoxies and associated processes. For example, it may be possible to generate nanovoided materials 510 that have switchable reflectivity without the need to completely compress the nanovoids 505 to generate the switching effect with high efficiency. This may be done by keeping the nanovoids 505 from fully collapsing at least in part due to different mechanical properties of the nanovoids 505, or of a polymer (e.g., the second polymer) coating the interior surfaces of the nanovoids 505, as compared with the polymer matrix (e.g., the first polymer) in which they are formed.

In some embodiments, the nanovoids (e.g., nanovoids 405 and/or 505 in FIGS. 4 and 5) may contain a compressible fluid (e.g., air). In another embodiment, once the solvent separates from the curable material to form the nanovoids during the fabrication of the nanovoided material, the nanovoided material may be dried and the solvent may be replaced by a compressible fluid (e.g., air). In another embodiment, when pressure is applied to the nanovoided materials, the voids may not be fully eliminated as there may still be compressed fluid (e.g., air) in the voids. In another embodiment, the voids may be further reduced in volume by compression; for example, by forming nanovoids that have an open-cell structure. Accordingly, the compressible fluid may be able to at least partially diffuse into the compressed matrix upon compression of the nanovoided material (e.g., as further shown and described in connection with FIG. 3).

Figure 6:
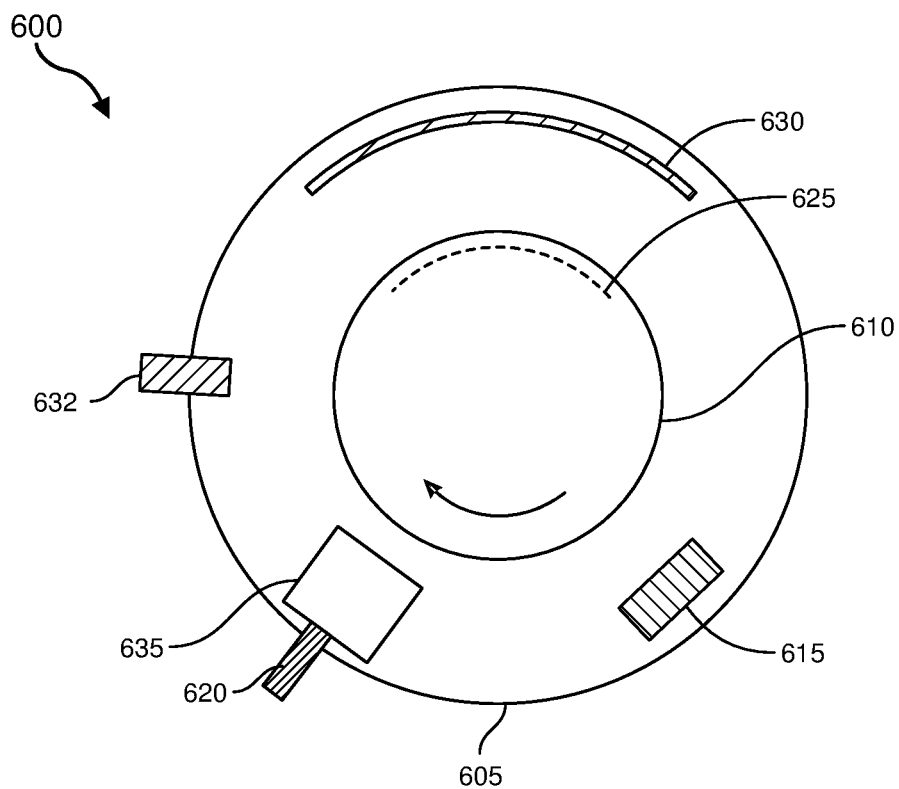
FIG. 6 shows a diagram of an apparatus that may be used for making a nanovoided spacer material, in accordance with example embodiments of the disclosure.

FIG. 6 shows a diagram including an apparatus that may be used for making nanovoided spacer materials, in accordance with example embodiments of the disclosure. In particular, the apparatus 600 may include a vacuum-based deposition apparatus including an enclosure (alternatively referred to as chamber) 605, a rotating drum 610, a heat source 625, an optional condenser 630, an optional source 615, a fluid source 620, and a curing source 632. As will be elaborated on further below, a multilayer stack of nanovoided spacer materials similar to that shown and described in connection with FIGS. 2 and 3, may be fabricated by alternating (i) depositions of solvent and a nanovoid matrix material (e.g., acrylate), (ii) heating away the solvent to create the nanovoided regions, and (iii) pumping in the nanovoid matrix material (e.g., acrylate) with no solvent. In various embodiments, a method for fabricating a multilayer stack of nanovoided spacer materials similar to that shown and described in connection with FIGS. 2 and 3 may include (i) condensing a first vapor on a substrate and applying radiation to the substrate to form a first layer, the first vapor including mixture of a first curable material, an initiator, and a solvent, (ii) condensing a second vapor on the first layer and applying radiation to the substrate to form a second layer having a first refractive index, the second vapor including a second curable material, and (iii) removing the solvent from the first layer to form a nanovoided layer having a second refractive index that may be greater than the first refractive index.

In some embodiments, the fluid source 620 may include be a fluid that may have both a monomer (e.g., acrylic acid) and an optional crosslinking agent (e.g., trimethylolpropane triacrylate, TMPTA). In some examples, "monomer" may refer to a monomer that forms a given polymer (i.e., as part of an optically transparent material). In another embodiment, the fluid from the fluid source 620 may flow into an evaporator 635, creating vapor of the monomer and cross-linker. This vapor may condense on a surface (e.g., a first transparent conductor 312) on the rotating drum 610 to form a first optically transparent material 302 (see, e.g., FIG. 3). Subsequent layers (e.g., second optically transparent material 304, and second transparent conductor 314 of FIG. 3) of the stack (e.g., nanovoid stack 355 of FIG. 3) may be similarly generated. Between depositions of layers or after deposition of two or more layers, a partially or fully fabricated nanovoided spacer material and/or electroactive device may be cured by the curing source 632. Further, after the deposition of the nanovoid stack, the nanovoided spacer material and/or electroactive device may be coated with a material by an optional source 615. For example, the optional source may apply a metal coating and/or a metal oxide coating, or combinations thereof (e.g., serving as a second transparent conductor), as discussed above. In some embodiments, there may be more than one optional source in addition to optional source 615.

In some embodiments, the apparatus 600 may use shadow masks to control the patterns of deposited materials to form a nanovoided spacer material and/or electroactive device. In some embodiments, the chamber 605 may be evacuated (e.g., using one or more mechanical vacuum pumps to a predetermined level such as $10^{-6}$ Torr or below). The chamber 605 may include a rigid material (e.g., steel, aluminum, brass, glass, acrylic, and the like). As noted, FIG. 6 shows an embodiment where the apparatus 600 may include a rotating drum 610. In some embodiments, the rotation of the rotating drum 610 may generate centrifugal energy and cause the deposited material to spread more uniformly over any underlying sequentially deposited materials (e.g., electrodes, optically transparent materials, and the like) that are mechanically coupled to the rotating drum 610. Alternatively, the rotating drum 610 may be configured to be fixed in position and the deposition and curing systems (e.g., monomers in the fluid source 620 and heat source 625, the optional source 615, and/or curing source 632) may be moving, or both the rotating drum 610 and the deposition and curing systems may be moving simultaneously.

In some embodiments, the curing source 632 may include an energized array of filaments or other radiation source that may generate actinic energy to initiate reaction between the monomers, monomer initiators, and/or cross-linking agents. In some examples, "actinic energy" may refer to energy capable of breaking covalent bonds in a material. Examples may include electrons, electron beams, x-rays, gamma rays, ultraviolet, and visible light at appropriately high energy levels, and ions. Additionally or alternatively, the heat source 625 may generate heat to initiate reaction between the monomers, monomer initiators, and/or the cross-linking agents. The monomers, monomer initiators, and/or cross-linking agents may react upon heating and/or actinic exposure to form optically transparent materials (e.g., first optically transparent material 302 in FIG. 3, etc.).

In some embodiments, an exhaust port (not shown) of the chamber 605 may open to release at least a portion of the vapor in chamber 605 between one or more depositions of the materials (e.g., monomers, crosslinking agents, conductive materials, etc.). In another embodiment, chamber 605 may be purged (e.g., with a gas or the application of a vacuum, or both), to remove a portion of the vapor (e.g., monomers, crosslinking agents, initiators, metal particles, and any resultant byproducts). Thereafter one or more of the previous steps may be repeated (e.g., for a second optically transparent material 304 in FIG. 3, etc.), as described above. In this way, individual layers of a nanovoided spacer material and/or electroactive device may be maintained at high purity levels.

In some embodiments, the deposition of the materials (e.g., monomers, crosslinking agents, conductive materials, etc.) of the nanovoided spacer material and/or electroactive device may be performed using a deposition process, such as chemical vapor deposition (CVD), to be described further below. CVD may refer to a vacuum deposition method used to produce high-quality, high-performance, solid materials. In CVD, a substrate may be exposed to one or more precursors, which may react and/or decompose on the substrate surface to produce the desired deposit (e.g., one or more transparent conductors, optically transparent materials, etc.). Frequently, volatile by-products are also produced, which may be removed by gas flow through the chamber 605.

As noted above, a flowable material (e.g., a solvent) may be combined with the curable materials (e.g., monomers) to create a flowable mixture that may be used for producing optically transparent materials including electroactive polymers (e.g., elastomers) with nanovoids. In some embodiments, the flowable material may be combined (e.g., mixed) with the curable material (e.g., monomers). In some embodiments, the curable material itself may be combined with at least one non-curable component (e.g., particles of a material having a high dielectric constant and/or initiators) to form a mixture including the curable material and the at least one non-curable component. Alternatively, the flowable material (e.g., solvent) may be introduced into the fluid source 620 to deposit (e.g., via vaporization using an evaporator 635 or, in alternative embodiments, via printing) the curable material onto the conductor. In some embodiments, the flowable material (e.g., solvent) may be deposited as a separate layer either on top of or below a curable material (e.g., a monomer), and the solvent and curable material may be allowed to diffuse into each other before being cured by the curing source 632 and/or heat source 625 to generate an optically transparent material having nanovoids. In some embodiments, after the curable material is cured, the solvent may be allowed to evaporate before another optically transparent material or another conductor is formed. In some embodiments, the evaporation of the solvent may be accelerated by the application of actinic energy by curing source 632, by application of heat to the substrate (not shown) by heat source 625, or by reducing the pressure of the solvent above the substrate using a condenser 630 (e.g., a device that condenses vapors into a liquid or solid), or a combination thereof. Isolators (not shown) may be added to the apparatus 600 to prevent, for example, the solvent vapor from interfering with the curing source 632, the condenser 630, or the optional source 615.

Figure 7:
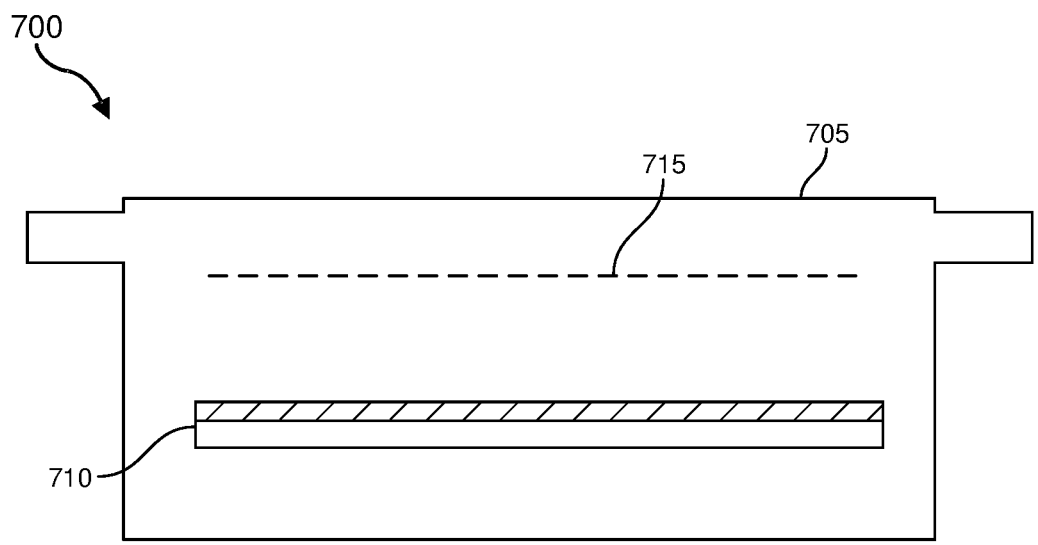
FIG. 7 shows a diagram of another apparatus that may be used for making a nanovoided spacer material, in accordance with example embodiments of the disclosure.

FIG. 7 shows another diagram including an apparatus that may be used for making nanovoided spacer material, in accordance with example embodiments of the disclosure. In particular, diagram 700 shows an apparatus 705 that may perform an initiated chemical vapor deposition (CVD) process. In another embodiment, in iCVD, an electric cooler (not shown) may be used to cool a substrate 710, and a mixture of, for example, an acrylate and a solvent vapor may be flowed into apparatus 705. This mixture may pass through an array of heated elements 715 that may be located in an upper portion of the apparatus 705. In another embodiment, the heated elements 715 may be about 200 degrees ° C., which may provide conditions sufficient to trigger an initiator. The substrate 710 may be concurrently cooled to a temperature below that of the heated elements. Accordingly, a mixture of solvent and monomer may condense on the surface of the substrate 710, where it may be cured. Alternatively or additionally, multiple layers of monomer and solvent-monomer mixture may be alternately deposited. The layers may be stacked through, for example, sequential deposition, and the solvent may be removed (e.g., through evaporation by heating) to generate a nanovoided structure. In another embodiment, relatively precise control of the temperature of the substrate and the multilayer deposited structure may be needed to generate a high-quality nanovoided spacer material and/or electroactive device. For example, active cooling may be used. In another embodiment, Henry's law may be used to infer that minor fluctuations of the low-pressure environment (e.g., the pressure of the chamber) will likely not substantially affect the vapor pressure of the solvent, and may therefore not negatively impact the quality, structure, and/or uniformity of the nanovoided materials.

In some embodiments, the apparatus 705 may apply an atmospheric pressure CVD (APCVD) coating formation technique (e.g., CVD at atmospheric pressure). In another embodiment, the apparatus 705 may apply a low-pressure CVD (LPCVD) process (e.g., CVD at sub-atmospheric pressures). In some embodiments, LPCVD may make use of reduced pressures that may reduce unwanted gas-phase reactions and improve the deposited material's uniformity across the substrate. In one embodiment, the apparatus 705 may apply an ultrahigh vacuum CVD (UHVCVD) process (e.g., CVD at very low pressure, typically below approximately $10^{-6}$ Pa (equivalently, approximately $10^{-8}$ torr)).

In some embodiments, the apparatus 705 may apply an aerosol-assisted CVD (AACVD) process (e.g., a CVD in which the precursors are transported to the nanovoided spacer material and/or electroactive device) by means of a liquid/gas aerosol, which may be generated ultrasonically. In some embodiments, AACVD may be used with non-volatile precursors.

In some embodiments, the apparatus 705 may apply a direct liquid injection CVD (DLICVD) process (e.g., a CVD in which the precursors are in liquid form, for example, a liquid or solid dissolved in a solvent). Liquid solutions may be injected in the apparatus 705 towards one or more injectors. The precursor vapors may then be transported to one or more materials of the electroactive device or a standalone optically transparent material including a nanovoided material, as in CVD. DLICVD may be used on liquid or solid precursors, and high growth rates for the deposited materials may be reached using this technique.

In some embodiments, the apparatus 705 may apply a hot wall CVD process (e.g., CVD in which the chamber of the apparatus 705 is heated by an external power source and the nanovoided spacer material and/or electroactive device is heated by radiation from the heated wall of the chamber). In another embodiment, the apparatus 705 may apply a cold wall CVD process (e.g., a CVD in which only the nanovoided spacer material and/or electroactive device is directly heated, for example, by induction, while the walls of the chamber are maintained at room temperature).

In some embodiments, the apparatus 705 may apply a microwave plasma-assisted CVD (MPCVD) process, where microwaves are used to enhance chemical reaction rates of the precursors for forming the electroactive device. In another embodiment, the apparatus 705 may apply a plasma-enhanced CVD (PECVD) process (e.g., CVD that uses plasma to enhance chemical reaction rates of the precursors). In some embodiments, PECVD processing may allow deposition of materials at lower temperatures, which may be useful in withstanding damage to the electroactive device or a standalone optically transparent material including a nanovoided material, in depositing certain materials (e.g., organic materials and/or some polymers).

In some embodiments, the apparatus 705 may apply a remote plasma-enhanced CVD (RPECVD) process. In some embodiments, RPECVD may be similar to PECVD except that the materials for forming the electroactive device may not be directly in the plasma discharge region. In some embodiments, the removal of the materials for forming the electroactive device or a standalone optically transparent material including a nanovoided material, from the plasma region may allow for the reduction of processing temperatures down to room temperature.

In some embodiments, the apparatus 705 may apply an atomic-layer CVD (ALCVD) process. In some embodiments, ALCVD may deposit successive layers of different substances to produce layered, crystalline film coatings on a nanovoided spacer material and/or electroactive device including a multilayer of optically transparent materials.

In some embodiments, the apparatus 705 may apply a combustion chemical vapor deposition (CCVD) process. In some embodiments, CCVD (also referred to as flame pyrolysis) may refer to an open-atmosphere, flame-based technique for depositing high-quality thin films (e.g., layers of material ranging from fractions of a nanometer (monolayer) to several micrometers in thickness) and nanomaterials, which may be used in forming an electroactive device or a standalone optically transparent material including a nanovoided material.

In some embodiments, the apparatus 705 may apply a hot filament CVD (HFCVD) process, which may also be referred to as catalytic CVD (cat-CVD) or initiated CVD (iCVD), as noted above. In some embodiments, this process may use a hot filament to chemically decompose the source gases to form the materials of the electroactive device or a standalone optically transparent material including a nanovoided material. Moreover, the filament temperature and temperature of portions of the electroactive device or standalone optically transparent material may be independently controlled, allowing colder temperatures for better adsorption rates at the electroactive device, and higher temperatures necessary for decomposition of precursors to free radicals at the filament.

In some embodiments, the apparatus 705 may apply a hybrid physical-chemical vapor deposition (HPCVD) process. HPCVD may involve both chemical decomposition of precursor gas and vaporization of a solid source to form the materials on the electroactive device or standalone optically transparent material.

In some embodiments, the apparatus 705 may apply metalorganic chemical vapor deposition (MOCVD) process (e.g., a CVD that uses metalorganic precursors) to form materials on the electroactive device or standalone optically transparent material.

In some embodiments, the apparatus 705 may apply a rapid thermal CVD (RTCVD) process. This CVD process uses heating lamps or other methods to rapidly heat the materials forming the electroactive device. Heating only the materials deposited on a substrate on which the electroactive device is formed rather than undeposited precursors or chamber walls may reduce unwanted gas-phase reactions that may lead to particle formation in the electroactive device or standalone optically transparent material.

In some embodiments, the apparatus 705 may apply a photo-initiated CVD (PICVD) process. This process may use UV light to stimulate chemical reactions in the precursor materials used to make the materials for the electroactive device or the standalone optically transparent material. Under certain conditions, PICVD may be operated at or near atmospheric pressure.

In various embodiment, while various CVD process are generally described above the various materials described herein (e.g., the curable materials, the non-curable material, the conductive materials, and any additional materials and layers may be disposed (e.g., on a substrate or an optical component) in any suitable manner. As noted, a substrate may generally refer to any material (e.g., a layer) on which another layer or element is formed. In another embodiment, the various materials for forming the electroactive device may be printed (e.g., via inkjet printing, silkscreen printing, etc.). In some embodiments, inkjet printing may refer to a type of computer printing that operates by propelling droplets of material onto a substrate (e.g., a flexible or inflexible substrate). In another embodiment, silkscreen printing may refer to a printing technique whereby a mesh is used to transfer a material (e.g., curable material and/or non-curable material) onto a substrate (e.g., a flexible or inflexible substrate), except in areas made impermeable to the material by a blocking stencil. A blade or squeegee may be moved across the screen to fill the open mesh apertures with the material, and a reverse stroke then causes the screen to touch the substrate momentarily along a line of contact. This may cause the material to wet the substrate and be pulled out of the mesh apertures as the screen springs back after the blade has passed. In one embodiment, the materials may be vaporized (e.g., via thermal evaporation, CVD, PVD, and the like), as described above. In at least one embodiment, materials for forming the device may be disposed (e.g., on a substrate) using a co-flow process and/or a roll-to-roll process. In some embodiments, monomers (or oligomers, and/or prepolymers and other pre-cursor materials) for forming electroactive polymer materials may optionally be mixed with a solvent and the solvent may be removed from the electroactive polymer during and/or following curing to form nanovoids within the electroactive polymer.

Figure 8:
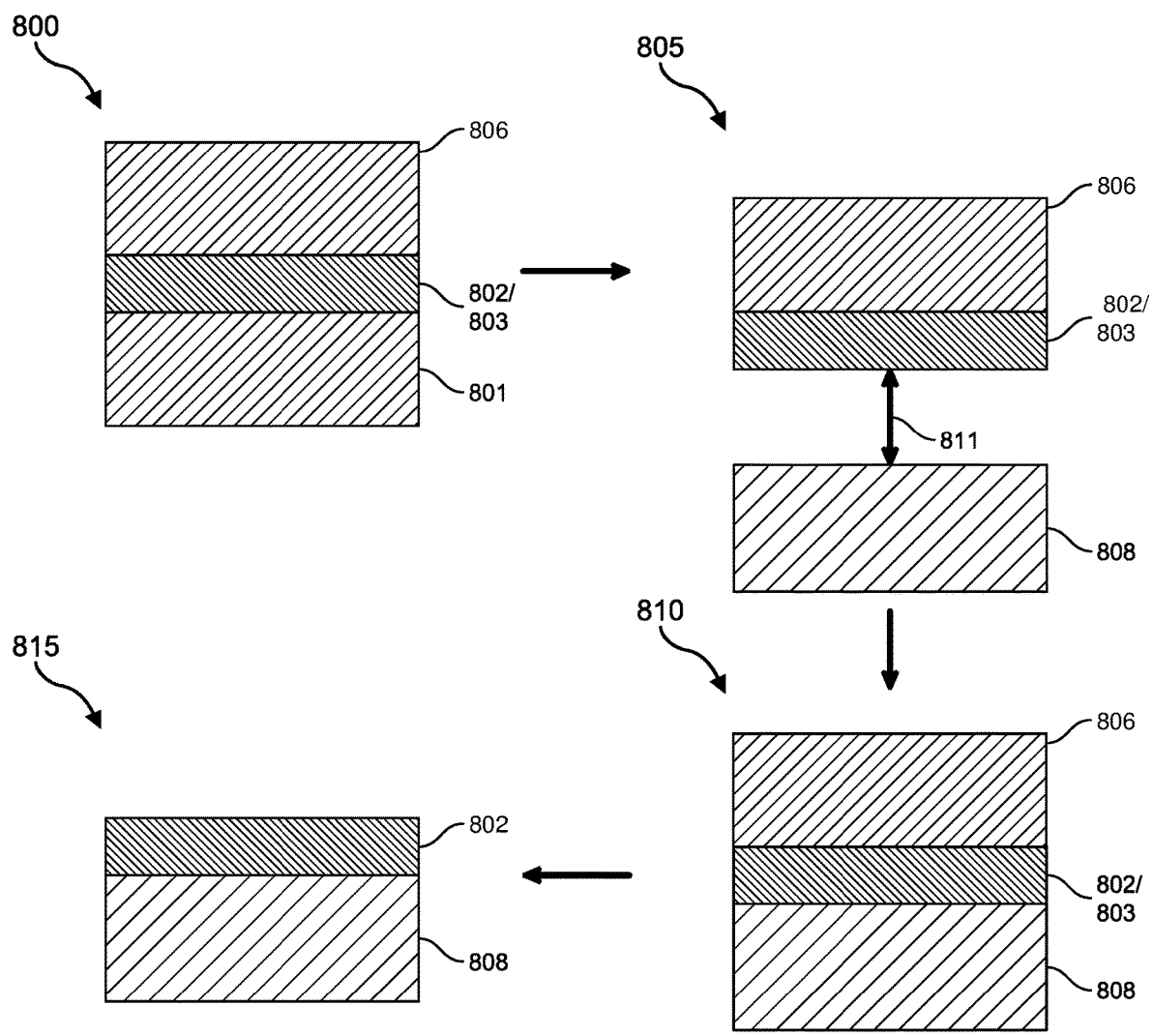
FIG. 8 shows a diagram illustrating an example method of using a nanovoided spacer material, in accordance with example embodiments of the disclosure.

FIG. 8 shows a diagram of an example method of using a nanovoided spacer material, in accordance with example embodiments of the disclosure. In an aspect, a protected structure 800 may include a first removable material 801 (e.g., a peelable material), a nanovoided spacer material 802 that may include a buffer material 803, and a second removable material 806. In particular, the first removable material 801 and the second removable material 806 may serve to protect the nanovoided spacer material 802 from external elements (dust, debris, etc.) and may allow the nanovoided spacer material 802 to be coupled to a surface of an optical element (e.g., optical elements 106 and 110 and/or optical elements 306 and 310 shown and described in connection with FIGS. 1-3, above).

In another embodiment, the first removable material 801 may include viscoelastic polymers with their rheology tuned to the desired bonding and de-bonding characteristics needed. In another embodiment, the first removable material 801 may include acrylate polymer, rubber (either natural rubber or synthetic thermoplastic elastomer, silicone rubber), and the like. In another embodiment, these materials may be blended with a tackifier to produce tack (e.g., a term that may refer to the grabbing power of the first removable material 801) at room temperature, may be somewhat deformable, may have low surface energy, and may be moisture resistant. Further, the materials may have a low cross-linking density, low viscosity ($\eta < 10,000$ cP), and may have broad molecular weight distribution to enable deformation of the adhesive material to the rough surface of an underlying substrate under various temperatures and peel conditions.

In one embodiment, the protected structure 800 may optionally include a buffer material 803. In one embodiment, the buffer material 803 may provide a planarization or passivation to the surface of the optical element that the nanovoided spacer material 802 is ultimately laminated on. In an embodiment, the buffer material 803 may include any suitable material. For example, the buffer material 803 may include a polyolefin-based resin such as polypropylene, polymethylpentene, and a cyclic olefin-based polymer (e.g., norbornene-based resins, triacetyl cellulose, polyethylene terephthalate, polycarbonate resin, polyethylene naphthalate, polyurethane, polyether ketone, polysulfone, polyether sulfone, polyester, polystyrene-based resin, or acrylic-based resin). In one embodiment, the buffer material 803 may be thicker than the nanovoided spacer material 802. In another embodiment, if the buffer material 803 is thin, the laminate including the buffer material 803 may be curled due to cure shrinkage of the resin constituting the buffer material 803.

In another embodiment, the interface between the first removable material 801 and the buffer material 803 and/or the nanovoided spacer material 802 may include an adhesive layer (not shown). In one embodiment, the adhesive layer may be made of any material. To the face of the adhesive layer opposite to the face where the buffer material 803 is provided, a separator film (e.g. polyethylene terephthalate (PET), not shown) for protection of the adhesive layer may be adhered.

In various embodiment, any suitable adhesive may be used. For example, the adhesive may be a self-assembled monolayer, a pressure sensitive adhesive (PSA), a standard reactive adhesive, or the like. Self-assembled monolayer adhesives may use a silane coupling agent including an alkoxysilane and a reactive functional group. The silane coupling unit may covalently react with a glass substrate and the reactive functional group may react with the nanovoided spacer material 802 or surfaces of any optical elements. Examples of silane coupling agents may include, for example, 3-glycidoxypropyltrimethoxysilane, (2-aminoethyl)aminopropyltriethoxysilane, aminopropyltrimethoxysilane, aminopropyltriethoxysilane, (2-aminoethyl)aminopropylmethyldimethoxysilane, methacyryloxypropylmethyltrimethoxysilane, ethacyryloxypropyltrimethoxysilane, glycidoxypropyltrimethoxysilane, mercaptopropyl tri methoxysilane, vinyltriacetoxysilane, chloropropyltrimethoxysilane, vinyltrimethoxysilane, octadecyldimethyl-[3-(trimethoxysilyl)-propyl]ammonium chloride, mercaptopropyl-methyl-dimethoxysilane, isocyanatopropyltriethoxysilane, (3-acryloxypropyl)trimethoxy-silane, and the like.

PSAs may be polymeric materials applied between two layers for forming a bond with the desired cohesive strength upon application of a light pressure. A primary mode of bonding for a pressure sensitive adhesive may not be chemical or mechanical, but rather may be a polar attraction of an adhesive to a given material. Pressure sensitive adhesives may be designed with a balance between flow and resistance to flow. The bond may form because the adhesive may be soft enough to flow or wet the substrate. The bond may have strength because the adhesive may be hard enough to resist flow when stress is applied to the bond. Once the adhesive and the substrate are in proximity of each other, additional molecular interactions occur, such as, for example, Van der Waals' forces, capillary forces and the like, or combinations thereof, which may provide a significant contribution to the strength of the bond.

When peeled from a surface (e.g., when removed from the buffer material 803), the adhesive may demonstrate a clean peel, cohesive splitting, delamination and the like, or combinations thereof. The rate of bond formation may be determined by the conditions under which the adhesive contacts a surface and may be controlled by the surface energy of the adhesive, the surface energy of the substrate, and the viscosity of the adhesive. Cohesion is the property of a pressure sensitive adhesive that allows it to resist shear stress. Cohesion may further be a measure of an adhesive's internal bond strength. Good cohesion may be necessary for a clean peel. In an embodiment, the adhesive layer may include a material that has a first index of refraction that is substantially similar to at least one of an index of refraction of an optical element to which the nanovoided spacer material 802 is to be coupled.

In one embodiment, the protected structure 800 may include a second removable material 806 (e.g., a peelable material). FIG. 8 shows a diagram of an example method of using an index gradient structure, in accordance with example embodiments of the disclosure. In another embodiment, the protected structure 800 may include a second removable material 806 (e.g., a peelable material). In another embodiment, the second removable material 806 may include viscoelastic polymers with their rheology tuned to the desired bonding and de-bonding characteristics needed. In another embodiment, the second removable material 806 may include acrylate polymer, rubber (either natural rubber or synthetic thermoplastic elastomer, silicone rubber), and the like. In another embodiment, these materials may be blended with a tackifier to produce tack (e.g., a term that may refer to the grabbing power of the second removable material 806) at room temperature, may be somewhat deformable, may have low surface energy, and may be moisture resistant. Further, the materials may have a low cross-linking density, low viscosity ($\eta<10,000$ cP), and may have broad molecular weight distribution to enable deformation of the adhesive material to the rough surface of an underlying substrate under various temperatures and peel conditions.

In various aspects, FIG. 8 illustrates aspects of the attachment of the nanovoided spacer material 802 to an optical element 808. In some embodiments, the first removable material 801 may be removed from the protected structure 800, to reveal a surface of the buffer material 803 (or if the buffer material 803 is not included in the protected structure 810, a surface of the nanovoided spacer material 802). Thereafter, the surface of the buffer material 803 may be coupled 811 (e.g., laminated, pressure laminated, etc.) onto a surface of the optical element 808, thereby yielding a semi-protected structure 810, as shown in FIG. 8.

In particular, the semi-protected structure 810 may still have a second removable material 806 that may protect the nanovoided spacer material 802. However, the second removable material 806 may be subsequently removed (e.g., peeled away) to yield a structure 815 that includes the exposed surface of the nanovoided spacer material 802 as shown in FIG. 8, and which may be subsequently laminated to a second optical element (not shown), using a similar process.

Figure 9:
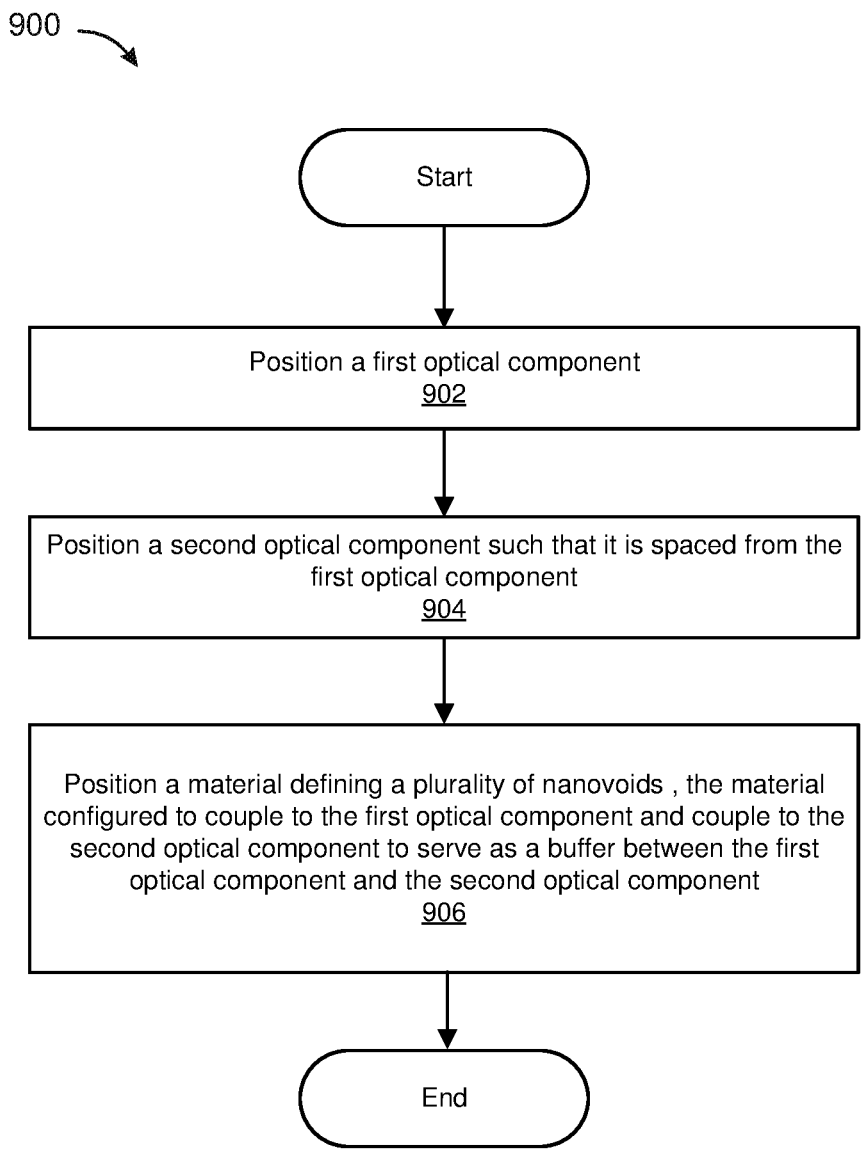
FIG. 9 shows a diagram of an example flow for the fabrication of an optical structure, in accordance with example embodiments of the disclosure.

FIG. 9 shows a diagram of an example flow diagram 900 illustrating aspects of the fabrication of a nanovoided spacer material, in accordance with example embodiments of the disclosure. At step 902, a first optical component may be positioned in accordance with various embodiments shown and described herein. As noted, the first optical component may include, but not be limited to, lenses, mirrors, windows, diffusers, filters, polarizers, prisms, beamsplitters, and/or diffraction gratings, and the like, as described above, for example, in connection with FIG. 1 and related description.

At step 904, a second optical component may be positioned such that it is spaced from the first optical component, in accordance with various embodiments disclosed herein. Again, as noted, the first optical component may include, but not be limited to, lenses, mirrors, windows, diffusers, filters, polarizers, prisms, beamsplitters, and/or diffraction gratings, and the like, as described above, for example, in connection with FIG. 1 and related description. In another embodiment, the spacing between the first optical component and the second optical component may be any suitable spacing, for example, anywhere from approximately 100 nm to approximately 10 mm. In another embodiment, the spacing may serve any suitable purpose, for example, in the case of the first optical component and the second optical component being lenses, the purpose of spacing the components may include increasing the optical power of an optical assembly that the first optical component and the second optical component are a part of.

At step 906, a material defining a plurality of nanovoids may be positioned, the material configured to couple to the first optical component and couple to the second optical component to serve as a buffer between the first optical component and the second optical component, in accordance with various embodiments shown and described herein. In one embodiment, the material may include a concentration of the nanovoids per unit volume that is approximately 10% to approximately 90%. In another embodiment, the material may include an average refractive index of about 1.05 to about 1.3.

In some embodiments, another method of generating a nanovoided polymer for use in connection with a nanovoided spacer material may include co-depositing (i) a monomer or mixture of monomers, (ii) a surfactant, and (iii) a nonsolvent material associated with the monomer(s) which is compatible with the surfactant. In various examples, the monomer(s) may include, but not be limited to, ethyl acrylate, butyl acrylate, octyl acylate, ethyethoxy ethyl acrylate, 2-chloroethyl vinyl ether, chloromethyl acrylate, methacrylic acid, allyl glycidyl ether, or N-methylol acrylamide. Other curing agents such as polyamines, higher fatty acids or their esters, or sulfur may be used as the monomer(s). In some embodiments, the surfactant may be ionic or non-ionic (for example Span 80, available from Sigma-Aldrich Company). In another embodiment, the non-solvent material may include organic or inorganic non-solvent materials. For instance, the non-solvent material may include water or a hydrocarbon or may include a highly polar organic compound such as ethylene glycol. As noted, the monomer or monomers, non-solvent, and surfactant may be co-deposited; alternatively, the monomer or monomers, non-solvent, and surfactant may be deposited sequentially. In one embodiment, a substrate temperature may be controlled to generate and control one or more properties of the resulting emulsion generated by co-depositing or sequentially depositing the monomer or monomers, non-solvent, and surfactant. The substrate may be treated to prevent destabilization of the emulsion. For example, an aluminum layer may be coated with a thin polymer layer made by depositing a monomer followed by curing the monomer.

Figure 10:
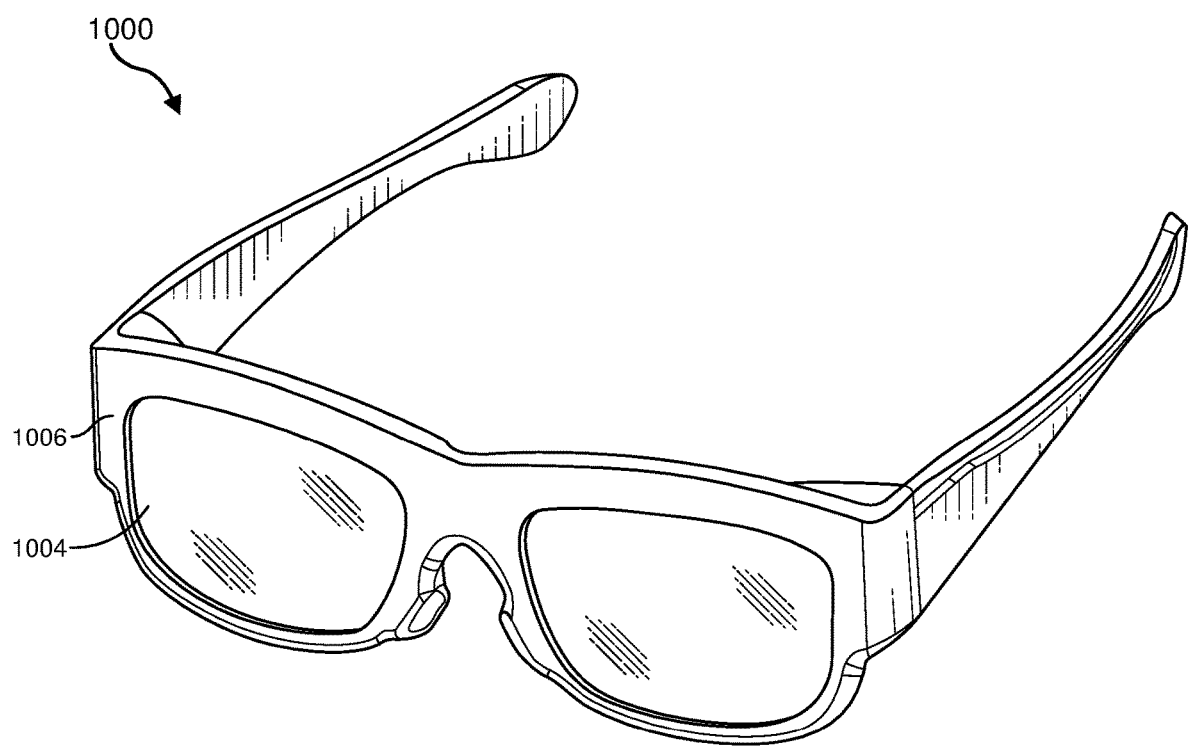
FIG. 10 shows a diagram of a head-mounted display (HMD), in accordance with example embodiments of the disclosure.

FIG. 10 shows a diagram of a head-mounted display (HMD), in accordance with example embodiments of the disclosure. As noted, the nanovoided materials may be used in the fabrication AR structures, mirrors for augmented reality (AR) systems that may include partially transparent displays that mix digital images with the real world.

In some embodiments, the HMD 1000 may include an NED, which may include one or more display devices 1004. The display device 1004 may present media to a user. Examples of media presented by the display device 1004 include one or more images, a series of images (e.g., a video), audio, or some combination thereof. In some embodiments, audio may be presented via an external device (e.g., speakers and/or headphones) that receives audio information from the display device 1004, a console (not shown), or both, and presents audio data based on the audio information. The display device 1004 may be generally configured to operate as an AR NED, such that a user may see media projected by the display device 1004 and see the real-world environment through the display device 1004. However, in some embodiments, the display device 1004 may be modified to also operate as a virtual reality (VR) NED, a mixed reality (MR) NED, or some combination thereof. Accordingly, in some embodiments, the display device 1004 may augment views of a physical, real-world environment with computer-generated elements (e.g., images, video, sound, etc.). In various aspects, the nanovoided spacer materials described herein may be used in connection with any optical components of such an HMD 1000.

The display device 1004 shown in FIG. 10 may include a support or frame 1006 that secures the display device 1004 in place on the head of a user, in embodiments in which the display device 1004 includes separate left and right displays.

In some embodiments, the frame 1006 may be a frame of eye-wear glasses. The display device 1004 may include structures (e.g., waveguides) with devices (e.g., Bragg reflectors, holographic Bragg reflectors, etc.) as described herein. In some embodiments, the devices may be manufactured by the processes described herein.

Embodiments of the instant disclosure may include or be implemented in conjunction with an artificial reality system. Artificial reality is a form of reality that has been adjusted in some manner before presentation to a user, which, as noted, may include, e.g., a VR, an AR, a MR, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. An optical system, including:
 a first optical component comprising a non-patterned surface and a patterned surface having a periodicity of about one nanostructure every 10 nm to 500 nm;

a second optical component spaced from the first optical component, the second optical component comprising a non-patterned surface and a patterned surface having a periodicity of about one nanostructure every 10 nm to 500 nm; and a polymer material that defines a plurality of nanovoids, each having a diameter of approximately 1000 nm or less, and serves as a buffer between the first optical component and the second optical component, wherein:

a first surface of the polymer material is proximate to and coupled to the patterned surface of the first optical component; and a second surface of the polymer material is proximate to and coupled to the patterned surface of the second optical component.

2. The optical system of claim 1, wherein at least one of the first optical component or the second optical component comprises at least one of a refractive element, a polarizing element, or a reflective element.

3. The optical system of claim 1, wherein a thickness of the polymer material and a concentration of the nanovoids per unit volume in the polymer material are configured to adjust an optical property associated with the optical system, the optical property including at least one of a reflectance, an absorption, or a transmittance of light incident on the optical system.

4. The optical system of claim 1, wherein the polymer material further comprises:

a first region having a first refractive index corresponding to a first concentration of nanovoids per unit volume; and a second region having a second refractive index corresponding to a second concentration of nanovoids per unit volume, the first region and the second region being overlapped in a thickness direction of the polymer material.

5. The optical system of claim 1, wherein the polymer material comprises a concentration of the nanovoids per unit volume that is approximately 10% to approximately 90%.

6. The optical system of claim 1, wherein the polymer material comprises an average refractive index of about 1.05 to about 1.3.

7. The optical system of claim 1, wherein the polymer material is fabricated using at least one of a chemical vapor deposition process, a thermal evaporation process, or a spin-coating process.

8. The optical system of claim 1, wherein the polymer material is laminated to the patterned surface of the first optical component or the patterned surface of the second optical component.

9. The optical system of claim 1, wherein a surface of the first optical component or a surface of the second optical component is convex, concave, flat, or irregular.

10. The optical system of claim 1, wherein the polymer material is coupled to the patterned surface of the first optical component or the patterned surface of the second optical component by an adhesive material.

11. The optical system of claim 10, wherein the adhesive material comprises an index of refraction that is greater than approximately 1.05.

12. A head-mounted display, including:
a display;

a first optical component comprising a non-patterned surface and a patterned surface having a periodicity of about one nanostructure every 10 nm to 500 nm;

a second optical component spaced from the first optical component, the second optical component comprising a non-patterned surface and a patterned surface having a periodicity of about one nanostructure every 10 nm to 500 nm; and a polymer material that defines a plurality of nanovoids, each having a diameter of approximately 1000 nm or less, and serves as a buffer between the first optical component and the second optical component, wherein:

a first surface of the polymer material is proximate to and coupled to the patterned surface of the first optical component; and a second surface of the polymer material is proximate to and coupled to the patterned surface of the second optical component.

13. The head-mounted display of claim 12, wherein the head-mounted display comprises an augmented reality device, a virtual reality device, or a mixed reality device.

14. The head-mounted display of claim 12, wherein the first optical component or the second optical component comprises at least one of a refractive element, a polarizing element, or a reflective element.

15. The head-mounted display of claim 12, wherein a thickness of the polymer material and a concentration of the nanovoids per unit volume in the polymer material are configured to adjust an optical property associated with the head-mounted display, the optical property including at least one of a reflectance, an absorption, or a transmittance of light in the head-mounted display.

16. The head-mounted display of claim 12, wherein the polymer material comprises a concentration of the nanovoids per unit volume that is approximately 10% to approximately 90%.

17. A method, including:

positioning a first optical component comprising a non-patterned surface and a patterned surface having a periodicity of about one nanostructure every 10 nm to 500 nm;

positioning a second optical component spaced from the first optical component, the second optical component comprising a non-patterned surface and a patterned surface having a periodicity of about one nanostructure every 10 nm to 500 nm;

positioning a polymer material that defines a plurality of nanovoids, each having a diameter of approximately 1000 nm or less, and serves as a buffer between the first optical component and the second optical component, wherein:

a first surface of the polymer material is proximate to and coupling the patterned surface of the first optical component; and a second surface of the polymer material is proximate to and coupling the patterned surface of the second optical component.

18. The method of claim 17, wherein the polymer material comprises a concentration of the nanovoids per unit volume that is approximately 10% to approximately 90%.

19. The method of claim 17, wherein the polymer material comprises an average refractive index of about 1.05 to about 1.3.

* * * * *